United States Patent
Wigren et al.

(10) Patent No.: US 11,296,765 B2
(45) Date of Patent: Apr. 5, 2022

(54) FIRST NETWORK NODE METHODS THEREIN FOR HANDLING DIRECTIONS OF TRANSMISSION OF BEAMFORMED BEAMS

(71) Applicant: Telefonaktiebolaget LM Ericsson (publ), Stockholm (SE)

(72) Inventors: Torbjörn Wigren, Uppsala (SE); Richard Middleton, North Lambton (AU); Ramon Delgado, Elermore Vale (AU); Katrina Lau, Wallsend (AU); Iana Siomina, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/258,438

(22) PCT Filed: Jul. 6, 2018

(86) PCT No.: PCT/SE2018/050742
§ 371 (c)(1),
(2) Date: Jan. 6, 2021

(87) PCT Pub. No.: WO2020/009629
PCT Pub. Date: Jan. 9, 2020

(65) Prior Publication Data
US 2021/0297130 A1     Sep. 23, 2021

(51) Int. Cl.
*H04B 7/06* (2006.01)
*G01S 5/02* (2010.01)
*H04W 16/28* (2009.01)

(52) U.S. Cl.
CPC .......... *H04B 7/0617* (2013.01); *G01S 5/0246* (2020.05); *H04W 16/28* (2013.01)

(58) Field of Classification Search
CPC ... H04W 16/28; H04B 7/0617; H04B 7/0695; G01S 5/0246
See application file for complete search history.

(56) References Cited

U.S. PATENT DOCUMENTS

| 11,019,505 | B1 * | 5/2021 | Files | H04W 16/28 |
| 11,083,046 | B2 * | 8/2021 | Karjalainen | H04W 28/0226 |

(Continued)

FOREIGN PATENT DOCUMENTS

| WO | 2018054498 A1 | 3/2018 | |
| WO | WO-2018050088 A1 * | 3/2018 | H04W 72/04 |

OTHER PUBLICATIONS

3GPP TR 36.897 V13.0.0, "3rd Generation Partnership Project; Technical Specification Group Radio Access Network; Study on elevation beamforming / Full-Dimension (FD) Multiple Input Multiple Output (MIMO) for LTE (Release 13)," Jun. 2015, 58 pages, 3GPP Organizational Partners.

(Continued)

*Primary Examiner* — Jaison Joseph
(74) *Attorney, Agent, or Firm* — NDWE LLP

(57) ABSTRACT

A method by a first network node for handling directions of transmission of beamformed beams by a first radio network node. Both nodes operate in a wireless communications network. The first network node determines, out of a set of directions in which the first radio network node is capable of transmitting the beams, a subset of directions of transmission of the beams having a probability of detection above a threshold, by a first wireless device. The determining is based on data obtained from previous attempts of positioning one or more second wireless devices using at least some of the directions. The first network node also initiates providing, to at least one of the first radio network node and a second network node operating in the wireless communications network, an indication of the determined subset.

15 Claims, 11 Drawing Sheets

(56) References Cited

U.S. PATENT DOCUMENTS 11,102,684 B1* 8/2021 Belser ............... H04W 36/0058
2017/0374637 A1 12/2017 Akkarakaran et al.

OTHER PUBLICATIONS

3GPP TS 36.305 V14.1.0, "3rd Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 14)," Mar. 2017, 78 pages, 3GPP Organizational Partners.
ETSI TS 125 305 V14.0.0, "Universal Mobile Telecommunications Systems (UMTS); Stage 2 functional specification of User Equipment (UE) positioning in UTRAN (3GPP TS 25.305 version 14.0.0 Release 14)," Apr. 2017, 97 pages, European Telecommunications Standards Institute.
Sven Fischer, "Observed Time Difference of Arrival (OTDOA) Positioning in 3GPP LTE," Jun. 6, 2014, 62 pages, Qualcomm Technologies, Inc.
International Search Report and Written Opinion for Application No. PCT/SE2018/050742, dated Mar. 25, 2019, 10 pages.
International Preliminary Report on Patentability for Application No. PCT/SE2018/050742, dated Jan. 21, 2021, 7 pages.

* cited by examiner a)

b)

FIRST NETWORK NODE METHODS THEREIN FOR HANDLING DIRECTIONS OF TRANSMISSION OF BEAMFORMED BEAMS

CROSS-REFERENCE TO RELATED APPLICATIONS

This application is a National stage of International Application No. PCT/SE2018/050742, filed Jul. 6, 2018, which is hereby incorporated by reference.

TECHNICAL FIELD

The present disclosure relates generally to a first network node and methods performed thereby for handling directions of transmission of beamformed beams by a first radio network node. Further particularly, the present disclosure relates generally to a first network node and methods performed thereby for handling directions of transmission of beamformed beams by a first radio network node, for the purpose of positioning a first wireless device.

BACKGROUND

Wireless devices within a wireless communications network may be e.g., User Equipments (UE), stations (STAs), mobile terminals, wireless terminals, terminals, and/or Mobile Stations (MS). Wireless devices are enabled to communicate wirelessly in a cellular communications network or wireless communication network, sometimes also referred to as a cellular radio system, cellular system, or cellular network. The communication may be performed e.g., between two wireless devices, between a wireless device and a regular telephone and/or between a wireless device and a server via a Radio Access Network (RAN) and possibly one or more core networks, comprised within the wireless communications network. Wireless devices may further be referred to as mobile telephones, cellular telephones, laptops, or tablets with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another terminal or a server.

The wireless communications network covers a geographical area which may be divided into cell areas, each cell area being served by a network node, which may be an access node such as a radio network node, radio node or a base station, e.g., a Radio Base Station (RBS), which sometimes may be referred to as e.g., evolved Node B ("eNB"), "eNodeB", "NodeB", "B node", gNB, Transmission Point (TP), or BTS (Base Transceiver Station), depending on the technology and terminology used. The base stations may be of different classes such as e.g., Wide Area Base Stations, Medium Range Base Stations, Local Area Base Stations, Home Base Stations, pico base stations, etc . . . , based on transmission power and thereby also cell size. A cell is the geographical area where radio coverage is provided by the base station or radio node at a base station site, or radio node site, respectively. One base station, situated on the base station site, may serve one or several cells. Further, each base station may support one or several communication technologies. The base stations communicate over the air interface operating on radio frequencies with the terminals within range of the base stations. The wireless communications network may also be a non-cellular system, comprising network nodes which may serve receiving nodes, such as wireless devices, with serving beams. In 3rd Generation Partnership Project (3GPP) Long Term Evolution (LTE), base stations, which may be referred to as eNodeBs or even eNBs, may be directly connected to one or more core networks. In the context of this disclosure, the expression Downlink (DL) may be used for the transmission path from the base station to the wireless device. The expression Uplink (UL) may be used for the transmission path in the opposite direction i.e., from the wireless device to the base station.

Positioning

UE positioning is recognized as an important feature for LTE networks due to its potential for massive user applications, for example, intelligent transportation, entertainment, industry automation, robotics, remote operation, healthcare, smart parking and so on, as well as its relevance to the United States Federal Communications Commission (US FCC) E911 requirements.

Positioning in LTE may be supported by the architecture shown in FIG. 1, with direct interactions between a UE 10 and a location server, the Evolved Serving Mobile Location Center (E-SMLC) 11, via the LTE Positioning Protocol (LPP) 12. Moreover, there may be also interactions between the location server and the eNodeB 13 via the LTE Positioning Protocol A (LPPa) 14, to some extent supported by interactions between the eNodeB 13 and the UE 10 via the Radio Resource Control (RRC) protocol 15. The eNodeB 13 and the E-SMLC 11 may also communicate with a Mobility Management Entity (MME) 16, which in turn communicates with a Gateway Mobile Location Centre (GMLC) 17.

In LTE, as described e.g., in 3GPP Technical Specification 36.305, v.14.1.0, several positioning techniques may be considered. A first technique is the Enhanced Cell Identifier (ID). Through this technique, cell ID information may be used to associate the UE to the serving area of a serving cell, and then additional information may be used to determine a finer granularity position.

Another technique is assisted Global Navigation Satellite System (GNSS). GNSS may be understood to encompass all systems that may provide worldwide positioning based on satellites, including, for example, the Global Positioning System (GPS), the Global Navigation Satellite System (GLONASS) and Galileo. In this technique, GNSS information may be retrieved by the UE, and it may be supported by assistance information provided to the UE from the E-SMLC.

Another technique is the Observed Time Difference of Arrival (OTDOA). In this technique, the UE may estimate the time difference of reference signals from different base stations and may send the result of the estimation to the Evolved Serving Mobile Location Center (E-SM LC) for multilateration.

Yet another technique is the Uplink TDOA (UTDOA). In this technique, the UE may be requested to transmit a specific waveform that may be detected by multiple location measurement units, e.g. an eNB, at known positions. These measurements may be forwarded to the E-SMLC for multilateration.

NR

The so-called 5G system, from a radio perspective started to be standardized in 3GPP, and the so-called New Radio (NR) is the name for the radio interface. NR architecture is being discussed in 3GPP. In the current concept, gNB denotes NR BS, where one NR BS may correspond to one or more transmission/reception points. In the 4G and in the emerging 5G cellular systems, beamforming and MIMO transmission will be central technologies. The reason in the 4G case is a desire for increased capacity. This can be obtained by the introduction of advanced antenna systems (AAS) and running MIMO-schemes. In addition, spectral resources are running out at low carrier frequencies which leads to a gradual migration into higher frequency bands. As the low carrier frequency bands were already deployed with 2G, 3G and 4G wireless communication systems, NR will be deployed at relatively higher frequencies than LTE. In the 5G case, the millimeter wave (mmW) Band, a Part of the Spectrum which is Above 6 GHz, also referred to as "FR2" in 3GPP or frequency range 2, will be used as well. There is e.g. plenty of available spectrum around 28 GHz and 39 GHz in the US and other areas. This spectrum may need to be exploited to meet the increasing capacity and latency requirements. The 5G frequency migration is expected to start at 3.5-5 GHz, and then continue to these 28 GHz and 39 GHz bands that are expected to become available soon. Communication at higher frequencies, e.g., above 6 GHz, is known to have more challenging propagation conditions such as a higher penetration loss. For wireless communication, the propagation loss may be roughly proportional to the square of the carrier frequency. Hence there may be coverage issues for wireless communication over high carrier frequencies. At high frequencies, beamforming and a use of massive antenna arrays may be needed to achieve a sufficient coverage.

Beamforming and MIMO

Multi-antenna techniques may significantly increase the data rates and reliability of a wireless communication system. The performance is in particular improved if both the transmitter and the receiver are equipped with multiple antennas, which results in a multiple-input multiple-output (MIMO) communication channel. Such systems and/or related techniques are commonly referred to as MIMO.

The 5th Generation (5G) technology, which is currently being developed, incorporates the use of beamforming. Beamforming may be understood as a signal processing technique which relies on combining elements in an array antenna in such a way that signals at particular angles experience constructive interference while others experience destructive interference. The beams used may typically be highly directive and provide gains of 20 decibels (dB) or more since so many antenna elements may participate in forming a beam. An array antenna may consist of many antenna elements to achieve a large array gain. Many antenna elements may participate in forming a beam, and the beams are typically highly directive, giving beamforming gains of 20 decibels (dB) or more. Each Transmission Point (TP) may, by use of an array antenna, generate transmission of a large number of beams having different pointing directions and/or polarizations. As the number of antennas increases, the energy may be focused with extreme precision into small regions in space. The result is spatial selectivity, such that beamforming may be understood as a way to transmit a signal with such narrow beams that it is intended for a single wireless device or a group of wireless devices in a similar geographical position. In 5G systems, the number of antenna elements at the transmitter and/or receiver side may be significantly increased compared to common 3G and 4G systems.

FIG. 2 is a schematic diagram representing an antenna array that may be used for beamforming. The diagram of FIG. 2 shows an idealized one-dimensional beamforming case. In case it is assumed that an UE 20 is located far away from the antenna array 25 it follows that the difference in travel distance from the base station here the array 25 is located to the UE 20, between adjacent antenna elements, is $l = k\lambda \sin(\theta)$, where $k\lambda$ is the antenna element separation. Here k is the separation factor which may be 0.5-0.7 in a typical correlated antenna element arrangement. This means that if a reference signal is transmitted from the base station to the UE 20 and if the beamformed signal component $s_i e^{j\omega t}$ transmitted from the i:th antenna element, it will arrive at the UE antenna 28 as a weighted sum $$s_{UE} = \sum_{i=0}^{N-1} s_i h_i e^{j\omega\left(t-\frac{il}{c}\right)} = e^{j\omega t} \sum_{i=1}^{N-1} s_i h_i e^{-j2\pi f_c \frac{ik\lambda\sin(\theta)}{f_c\lambda}} = e^{j\omega t} \sum_{i=1}^{N-1} s_i h_i e^{j2\pi i k \sin(\theta)}.$$

Here $\omega$ is the angular carrier frequency, $h_i$ is the complex channel from the i:th antenna element, t is the time, and $f_c$ is the carrier frequency. In the above equation $\theta$ and $h_i$ are unknown. In case of a feedback solution, the UE 20 therefore may need to search for all complex channel coefficients $h_i$ and the unknown angle $\theta$. For this reason, the standard defines a codebook of beams in different directions given by steering vector coefficients such as:

$w_{m,i} = e^{-jf(m,i)}$ where m indicates a directional codebook entry. The UE 20 may then test each codebook and estimate the channel coefficients. The information rate achieved for each codebook entry m may be computed, and the best one may be understood to define the direction and channel coefficients. This may be possible since $s_i$ is known. The result may then be encoded and reported back to the base station. This may provide the base station with a best direction, that is, a codebook entry, and information that may allow it to build up a channel matrix H. This matrix may be understood to represent the channel from each of the transmit antenna elements to each of the receive antenna elements. Typically, each element of H is represented by a complex number.

The channel matrix may then be used for beamforming computations, or the direction represented by the reported codebook entry may be used directly. In case of MIMO transmission, the MIMO beamforming weight matrix W may need to be determined so that a best match to the requirement WH=I may be achieved, where I denotes the identity matrix. In case of an exact match, each layer will become independent of other layers. This concept may be applied for single users or multiple users.

Reference Signals Supporting Beamforming

The description of the present subsection is given in terms of the 3GPP terminology for the 4G LTE system. The 5G functionality may be understood to correspond to that provided in the 4G system.

The Channel State Information Reference Signals (CSI-RS), which have been available since release 11, may be assigned to a specific antenna port. These reference signals may be transmitted to the whole cell, or may be beamformed in a UE specific manner. In 3GPP from release 13, two classes of CSI-RS reporting modes have been introduced: class A CSI-RS may be understood to refer to the use of fixed-beam codebook based beamforming, while a class B CSI-RS process may send beamformed CSI-RS in any manner.

A CSI-RS process in a UE may comprise detection of selected CSI-RS signals, measuring interference and noise on Channel State Information Interference Measurement (CSI-IM), and reporting of the related CSI information, in terms of Channel Quality Indication (CQI), Pre-coder Matrix Index (PMI), and (channel matrix) Rank Indication (RI), that is the selected codebook entry. A UE may report more than one set of CQI, RI and PMI, that is, information for more than one codebook entry. Up to 4 CSI-RS RS processes may be set up for each UE, starting in 3GPP release 11.

2D Codebooks and Antenna Port Relations

The description of the present subsection is given in terms of the 3GPP terminology for the 4G LTE system. The 5G functionality may be understood to correspond to that provided in the 4G system.

As stated above, the codebook of the 3GPP standard is defined to represent certain directions. In release 13, directions in both azimuth and elevation are defined, thereby allowing 2D beamforming to be used. These 4G codebooks are specified in detail in 3GPP TR 36.897. A similar definition, but with finer granularity is expected for the 3GPP 5G standard.

To illustrate that the codebooks indeed define specific directions, it may be noted that the formula for the azimuth codebook is $$w_k = \frac{1}{\sqrt{K}} \exp\left(-j\frac{2\pi}{\lambda}(k-1)d_V \cos\theta_{etilt}\right) \text{ for } k = 1, \ldots, K.$$

It has the same structure as discussed above. Similarly, the vertical codebook in that document is given by $$v_{l,i} = \frac{1}{\sqrt{L}} \exp\left(-j\frac{2\pi}{\lambda}(l-1)d_H \sin\vartheta_i\right) \text{ for } l = 1, \ldots, L.$$

In the two above equations, it is only the structure that is needed here, the details of the involved quantities are of less importance and are not reproduced here, see 3GPP TR 36.897 for all details. Finally, it may be noted that a 2D beam may be obtained by a multiplication of the two above equations.

TDOA Positioning Methods

The major conceptual difference between uplink time difference of arrival (UTDOA) and observed time difference of arrival (OTDOA) may be understood to be that the latter may require multiple transmit points at different locations whilst the former may utilize multiple receive points at different locations, typically base stations, although the UE position calculation principle is the same.

OTDOA Positioning Measurements

The time of arrival measurements for the OTDOA method may be primarily performed using Positioning Reference Signals (PRSs) in the 4G LTE system, and similarly for the 5G counterpart currently in standardization.

Real Time Differences

The wireless network where OTDOA may be deployed may not be perfectly synchronized. The time differences between the base stations and between the UE and the base station may then need to be compensated for. The clock bias of the UE may be handled by forming differences of the time of arrival measurements in the UE or in the base stations. This implies that the UE clock bias with respect to the reference time system disappears from the positioning equations. The differences in time between the different base stations may be denoted real time differences. These may be obtained from so called Location Measurement Units (LMUs) that may be understood to be located at known positions with clocks aligned to the currently applied time base. By listening to the base stations, it may then become possible to compute and track the real time differences, by solving the positioning equations for the real time differences.

OTDOA Positioning Principle

The geometry of the position calculation is depicted in FIG. 3. FIG. 3 is a schematic diagram illustrating the geometry for the discussion herein of OTDOA position calculation methods. In FIG. 3, a UE 30, which may be referred to herein as the "terminal", and a number of base stations 35 are schematically represented, as well as a number of cells 37, served by the base stations 35. Each time difference of arrival equation is represented in FIG. 3 as an hyperbole. The user location is resolved by finding the intersection of these hyperboles. The discontinued lines may represent the distance ||r1-rterminal|| in the following equations. Since this distance is captured by the Time of arrival measurements, the discontinued lines may be understood to also represent the TOA measurements. Assuming that the measurements of transmitted PRSs are successful for a number of base stations 35, three of which are depicted in FIG. 3, the following relations between the measured TOAs in the UE 30 the transmission times from the base stations 35, and the distances between the UE 35 and the transmitter locations, typically the base stations 35, may follow:

$$t_{TOA,1} + b_{clock} = T_{transmit,1} + \|r_1 - r_{terminal}\|/c$$

.
.
.

$$t_{TOA,n} + b_{clock} = T_{transmit,n} + \|r_n - r_{terminal}\|/c$$

Here $t_{TOA,i}$, i=1, . . . , n denote the measured time of arrivals (TOAs) in the UE 35, of transmitted signals from base stations 35 located in $r_i$, i=1, . . . , n, $T_{transmit,i}$ i=, . . . , n denote the transmission times from the base stations 35, and c is the speed of light. The boldface quantities are the (vector) locations of the base stations 35 and the UE 35. $b_{clock}$ denotes the unknown clock bias of the UE 30 with respect to cellular system time. Now, in OTDOA positioning, time of arrival differences with respect to the own site may be formed according to:

$$t_{TOA,2} = t_{TOA,2} - t_{TOA,1} = T_{transmit,2} - T_{transmit,1} + \|r_1 - r_{terminal}\|/c - \|r_1 - r_{terminal}\|/c$$

.
.
.

$$t_{TOA,n} = t_{TOA,n} - t_{TOA,1} = T_{transmit,n} - T_{transmit,1} + \|r_n - r_{terminal}\|/c - \|r_1 - r_{terminal}\|/c$$

In these n−1 equations, the left hand sides are known, with some additional measurement error. So are the real time differences. Furthermore, the locations of the measurement locations, $r_i$, i=1, . . . , n, may be surveyed to within a few meters and so they are known as well. What remains unknown is the location of the UE 30, that is, $$r_{terminal} = (x_{terminal}\ y_{terminal}\ z_{terminal})^T.$$

In the more common case, a two-dimensional positioning may be performed, then the unknown position may be instead:

$$r_{Terminal} = (x_{Terminal}\ y_{Terminal})^T$$

It then follows that at least three time of arrival differences may be needed to find a 3D terminal position, and that at least two time of arrival differences may be needed in order to find a 2D terminal position. This, in turn, may be understood to mean that at least four sites may need to be detected for 3D terminal positioning and at least three sites may need to be detected for 2D terminal positioning. In practice, accuracy may be improved if more measurements are collected, and a maximum likelihood solution is introduced. There may also be multiple false solutions in cases where only a minimum number of sites may be detected. In practice, the UE may need to measure the signals from 5-6 distinct locations, that is, not only from direct neighbour cells but also from more remote sites.

A challenge with the presently available existing positioning methods is that the wireless system is designed with cell ranges that are consistent with the maximum beam gain that may be obtained from an antenna array with N elements. Where each cell is designed to provide coverage to a certain geographical area, a cell range may be understood to refer to the maximum range at which a user may "hear" a given base station. Therefore, unless the pilot signals are transmitted/received with a maximum beam gain, they may not be detectable at the cell edge, meaning that the ability to detect neighbor sites may be compromised unless high gain beamforming is used for all sites involved in the OTDOA positioning. Furthermore, since the location of the UE to be positioned is not yet known at this stage, there is no knowledge about where to point the beams, especially from the neighbor cells which may not be even aware of that a UE is measuring them for positioning purposes. This may be understood to mean that all possible beam directions need to be scanned, that is, that PRS from all beams may need to be transmitted at least once within some time interval, for each site. This scanning quickly becomes troublesome when the number of involved positioning nodes increases. One reason for this is that in the OTDOA method, all involved nodes need to sweep all beam directions and transmit positioning pilots to. Such positioning methods consume resources, create additional interference, and increase the positioning time.

SUMMARY

It is an object of embodiments herein to improve methods of determining a location of a wireless device in a wireless communications network. It is a particular object of embodiments herein to improve the handling of directions of transmission of beamformed beams in a wireless communications network for positioning purposes.

According to a first aspect of embodiments herein, the object is achieved by a method performed by a first network node. The method is for handling directions of transmission of beamformed beams by a first radio network node. The first network node and the first radio network node operate in a wireless communications network. The first network node determines, out of a set of directions in which the first radio network node is capable of transmitting the beamformed beams, a subset of directions of transmission of the beamformed beams. The subset of directions of transmission of the beamformed beams have a probability of detection above a threshold, by a first wireless device operating in the wireless communications network. The determining is based on data obtained from previous attempts of positioning one or more second wireless devices using at least some of the directions in the set of directions. The first network node further initiates providing, to at least one of: the first radio network node and a second network node operating in the wireless communications network 100, an indication of the determined subset.

According to a second aspect of embodiments herein, the object is achieved by the first network node, configured to handle directions of transmission of beamformed beams by the first radio network node. The first network node and the first radio network node are configured to operate in the wireless communications network. The first network node is further configured to determine, out of the set of directions in which the first radio network node is configured to be capable of transmitting the beamformed beams, the subset of directions of transmission of the beamformed beams. The subset is configured to have the probability of detection above the threshold, by the first wireless device. The first wireless device is configured to operate in the wireless communications network. To determine is configured to be based on the data configured to be obtained from the previous attempts of positioning the one or more second wireless devices using at least some of the directions in the set of directions. The first network node is further configured to initiate providing, to at least one of: the first radio network node and the second network node configured to operate in the wireless communications network, the indication of the subset configured to be determined.

By the first network node determining the subset of directions of transmission of the beamformed beams having the probability of detection above the threshold, out of the set of directions in which the first radio network node is capable of transmitting, and then providing the indication to the first radio network node, the radio network nodes may be enabled to refrain from transmitting in many of the directions of the set. This enables substantial savings in terms of scan time, which in turn results in reduced interference. Therefore, the latency, energy and processing resources of the system are reduced, while the capacity is increased, improving the performance of the wireless communications network.

BRIEF DESCRIPTION OF THE DRAWINGS

Examples of embodiments herein are described in more detail with reference to the accompanying drawings, according to the following description.

DETAILED DESCRIPTION

Figure 1:
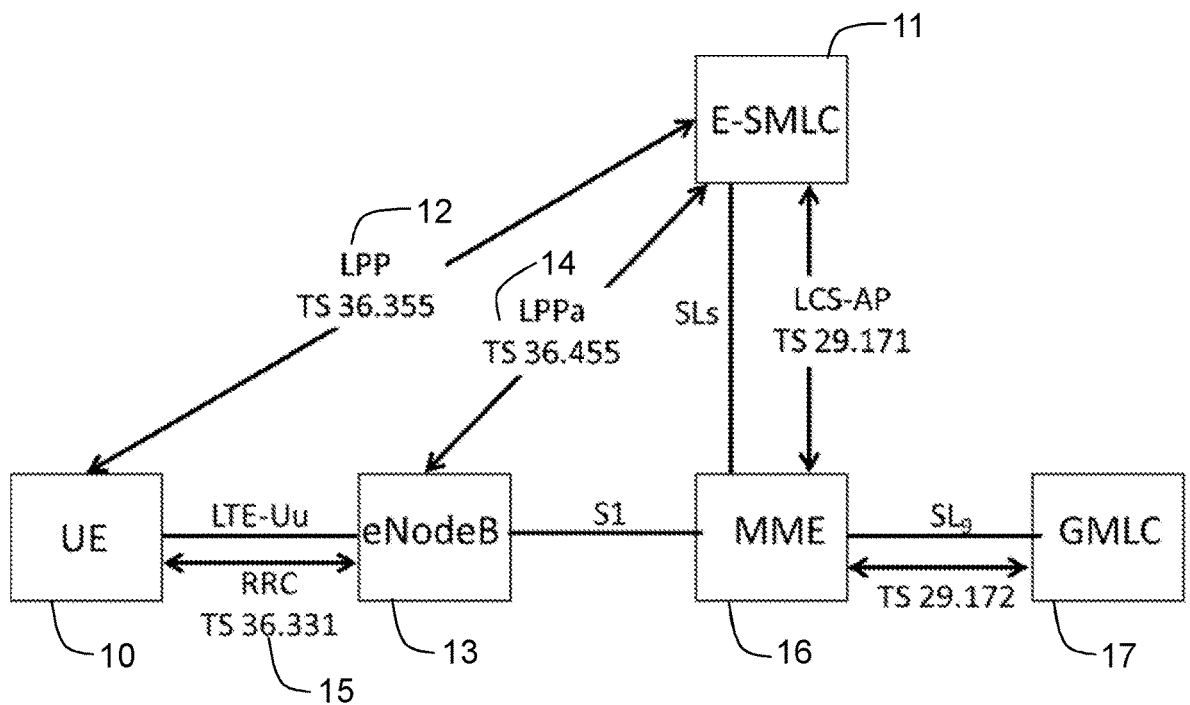
FIG. 1 is a schematic diagram illustrating an LTE positioning architecture.
Figure 2:
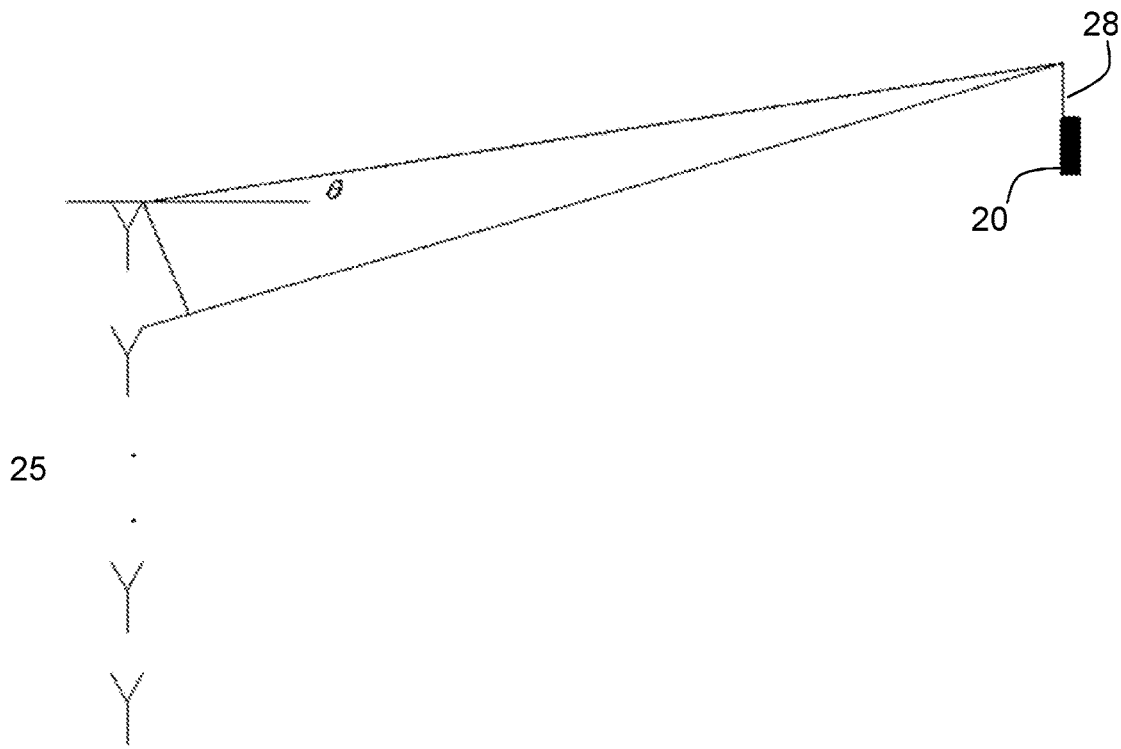
FIG. 2 is a schematic diagram representing an antenna array that may be used for beamforming.
Figure 3:
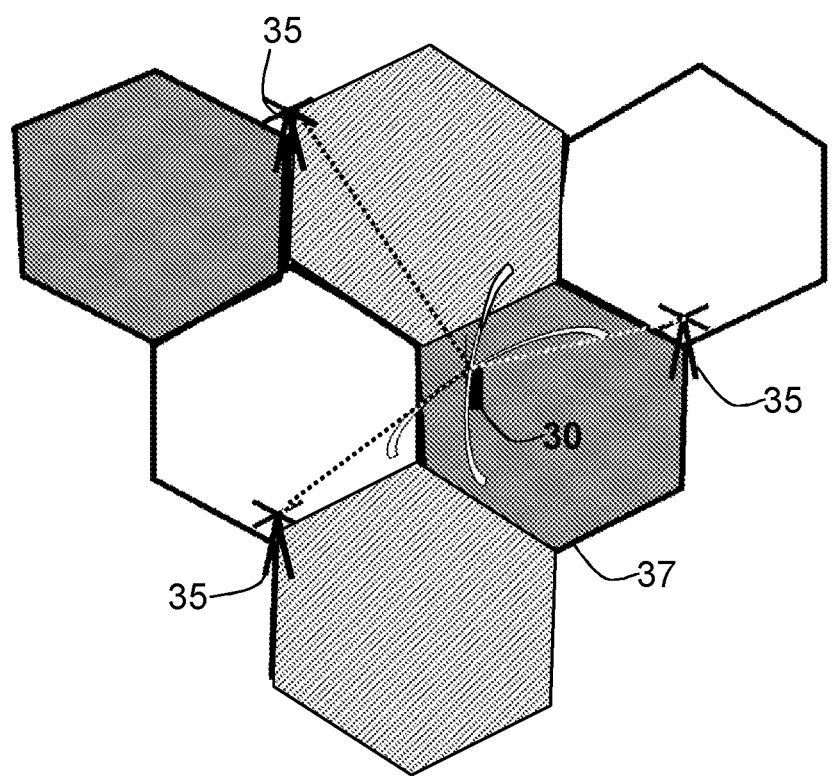
FIG. 3 is a schematic diagram illustrating a geometry of OTDOA position calculation methods.

Before describing embodiments herein in detail, one or more terms used herein will first be described.
Terminology The term PRS is used herein as a generic term to denote one or more signals or channels used for positioning measurements.

Examples of the signals and/or channels may be: reference signals, positioning reference signals, Primary Synchronization Signals (PSS), Secondary Synchronization Signals (SSS), synchronization signal and Physical Broadcast CHannel (PBCH) block, interchangeably also called Synchronization Signal Block (SSB) or SS block or SS/PBCH block, CSI-RS, DeModulation Reference Signal (DM-RS), Timing Reference Signal (TRS), Sounding Reference Signal (SRS), etc.

Examples of positioning measurements may be: Reference Signal Time Difference (RSTD), TDOA, TOA, and a timing measurement.

Herein, the term scanning may be understood to comprise at least determining the directions or beams. The scanning may be per site, per cell, per Transmission Point (TP), or Transmission/Reception Point (TRP), or per cell portion area, e.g., selecting from a set of directions/beams in a cell which are additionally associated with a specific cell portion, e.g., having some footprint in that cell portion area.

The term beam or transmission direction or reception direction herein may be understood to comprise any directional transmission or reception. This may be achieved by combining elements in an antenna array in such a way that signals at particular angles may experience constructive interference, or gain, while others may experience destructive interference, or loss. The signals/channels may be associated with a specific beam through its time-frequency resource or absolute or relative time-frequency resource location index, e.g., SSB index or signal location index within a block; first SSB within a set of SSBs transmitted within an SS block based RRM measurement Timing Configuration (SMTC) window corresponds to beam X, second SSB within a set of SSBs transmitted within SMTC window corresponds to beam Y, etc., wherein a signal from a certain beam may be transmitted in the corresponding time-frequency resources or a set of time-frequency resources, through its signal sequence, which may be generated based on a beam index, through the beam-specific information, e.g., beam index, etc., transmitted via the channel, e.g., PBCH may contain beam index information, etc. A beam may be characterized by or further associated with its identity, mapping to a certain beam or beam configuration, main beam direction, e.g., degrees in 2D or 3D space, coordinates characterizing the main beam direction as projected to the coordinates planes or a cube of a predefined dimension, transmission power, beam width, SSB index, frequency, etc.

Embodiments herein address the problems of the existing solutions. To address these challenges, embodiments herein may be understood to relate to providing a beamforming learning method that reduces the scanning that may be needed for TDOA positioning. At the same time, the sensitivity of the OTDOA position measurements may be understood to be improved. Embodiments herein may be understood to exploit beamforming opportunities that may arise in both the high mmW frequency bands and the lower 4G and 5G bands, below 6 GHz, also referred to as "FR1" or frequency range 1 in 3GPP. The improved beam scanning provided which may be integrated into time-difference-of-arrival positioning methods. In particular, embodiments herein disclose methods that may: i) significantly reduce the multi-site scanning latency, when applying time-difference-of-arrival positioning in the downlink, where the method is known as observed-time-difference-of-arrival (OTDOA); and ii) increase the adaptability of the TDOA detection to the locally observed beam presence, in general in the scenarios where beamforming may be extensively used, this being a result of a corresponding search space reduction.

In brief, embodiments herein may be understood to relate to OTDOA positioning methods using estimated beam direction statistics.

Embodiments will now be described more fully hereinafter with reference to the accompanying drawings, in which examples are shown. In this section, the embodiments herein will be illustrated in more detail by a number of exemplary embodiments. It should be noted that the exemplary embodiments herein are not mutually exclusive. Components from one embodiment may be tacitly assumed to be present in another embodiment and it will be obvious to a person skilled in the art how those components may be used in the other exemplary embodiments.

Note that although terminology from 3GPP NR has been used in this disclosure to exemplify the embodiments herein, this should not be seen as limiting the scope of the embodiments herein to only the aforementioned system. Other wireless systems, including LTE, supporting the functionality described, may also benefit from exploiting the ideas covered within this disclosure.

Figure 4:
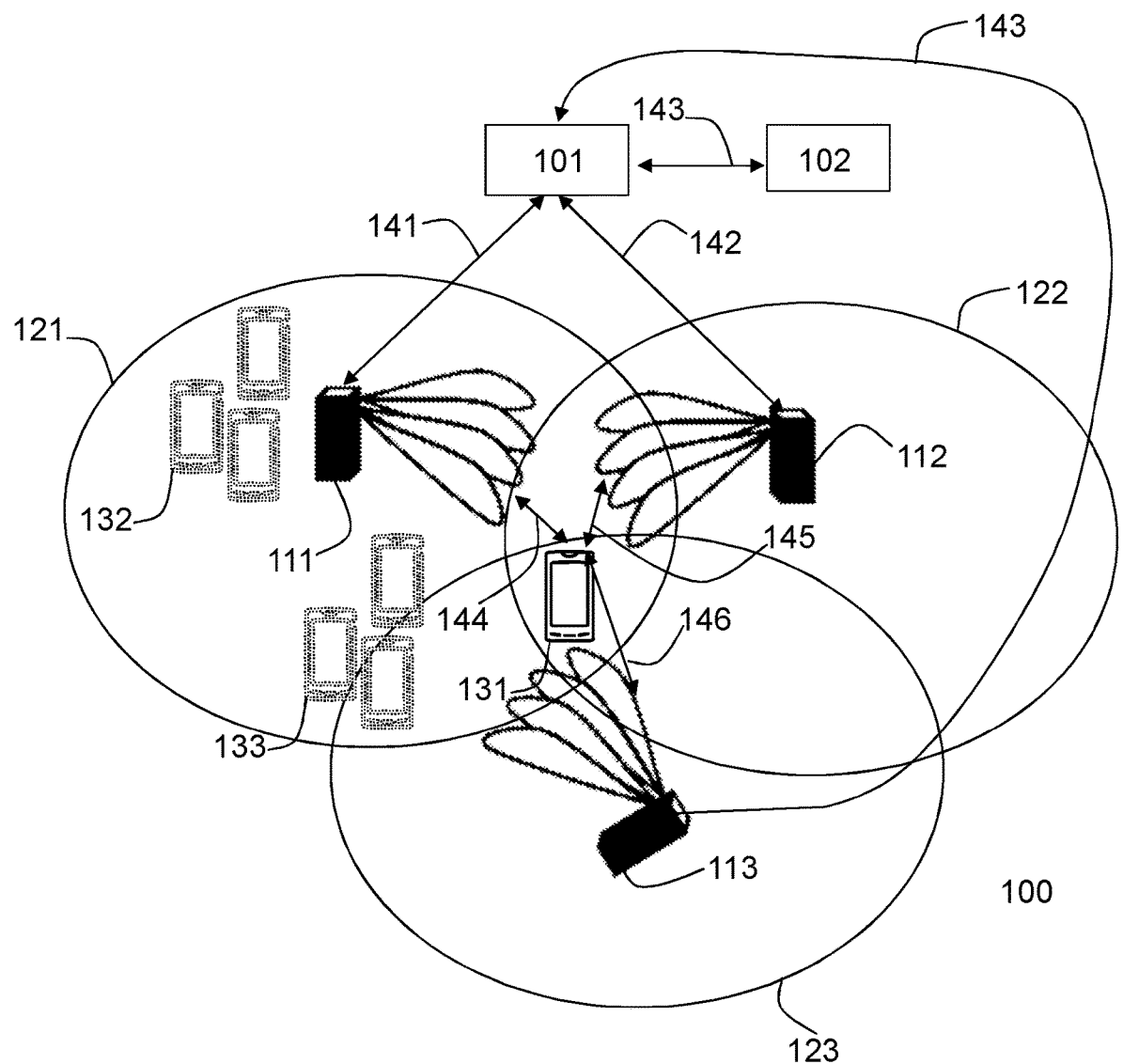
FIG. 4 is a schematic diagram illustrating embodiments of a wireless communications network, according to embodiments herein.

FIG. 4 depicts an example of a wireless communications network 100, sometimes also referred to as a cellular radio system, cellular network or wireless communications system, in which embodiments herein may be implemented. The wireless communications network 100 may for example be a 5G system, 5G network, NR or Next Gen System or network. The wireless communications network 100 may support operation with other networks such as a Long-Term Evolution (LTE) network, e.g., LTE Frequency Division Duplex (FDD), LTE Time Division Duplex (TDD), LTE Half-Duplex Frequency Division Duplex (HD-FDD), LTE operating in an unlicensed band, Wideband Code Division Multiple Access (WCDMA), Universal Terrestrial Radio Access (UTRA) TDD, Global System for Mobile communications (GSM) network, GSM/Enhanced Data Rate for GSM Evolution (EDGE) Radio Access Network (GERAN) network, Ultra-Mobile Broadband (UMB), EDGE network, network comprising of any combination of Radio Access Technologies (RATs) such as e.g. Multi-Standard Radio (MSR) base stations, multi-RAT base stations etc., any 3rd Generation Partnership Project (3GPP) cellular network, WiFi networks, Worldwide Interoperability for Microwave Access (WiMax), or any cellular network or system, which may be younger than 5G, yet capable to perform the functionality described. Thus, although terminology from 3GPP NR/LTE may be used in this disclosure to exemplify embodiments herein, this should not be seen as limiting the scope of the embodiments herein to only the aforementioned system.

The wireless communications network 100 comprises a plurality of network nodes whereof a first network node 101, and a second network node 102 are depicted in FIG. 4.

The first network node 101 is a network node that has a capability to analyze beamforming information. The first network node 101 may typically be a core network node, although in some examples, it may be a radio network node. The first network node 101 may itself have a capability to perform location services. In a typical example, the first network node 101 may be a location server, such as an E-SMLC in LTE, 4G eSMLC, or 5G eSMLC. In another example, the first network node 101 may be an RTK GNSS server or an MME. Yet in another example, the first network node 101 may be radio network node, e.g., a gNB, a 4G eNB, or a 5G eNB.

The second network node 102 may be understood as another network node or radio network node with a capability to process and/or forward the information provided by the first network node 101. Any of the first network node 101 and the second network node 102 may be implemented as one or more distributed nodes, one or more of which may be virtual nodes in the cloud. In some examples, any of the first network node 101 and the second network node 102 may be co-localized, partly co-localized, or be the same network node. In some particular examples, the second network node 102 may be a core network node, e.g. an MME. Each of the first network node 101 and the second radio network node 112 may be connected to different core networks and be operated by the same or different operators.

The wireless communications network 100 also comprises a plurality of radio network nodes whereof a first radio network node 111, a second radio network node 112 and a third radio network node 113 are depicted in FIG. 4.

Each of the first network node 111, the second network node 112, and the second radio network node 112 may typically be a base station or Transmission Point (TP) with beamforming capability, or any other network unit capable to serve, with serving beamformed beams, a wireless device or a machine type node in the wireless communications network 100. Each of the first network node 111, the second network node 112, and the second radio network node 112 may be e.g., a gNB, a 4G eNB, or a 5G eNB. Any of the first radio network node 111, the second radio network node 112, and the third radio network node 113 may be e.g., a Wide Area Base Station, Medium Range Base Station, Local Area Base Station and Home Base Station, based on transmission power and thereby also coverage size. Any of the first radio network node 111, the second radio network node 112, and the third radio network node 113 may be a stationary relay node or a mobile relay node. Any of the first radio network node 111, the second radio network node 112, and the third radio network node 113 may support one or several communication technologies, and its name may depend on the technology and terminology used. Any of the first radio network node 111, the second radio network node 112, and the third radio network node 113 may be directly connected to one or more networks and/or one or more core networks.

The wireless communications network 100 covers a geographical area which may be divided into cell areas, wherein each cell area may be served by a network node, although, one radio network node may serve one or several cells. In the non-limiting example depicted in FIG. 4, the first radio network node 111 serves a first cell 121, the second radio network node 112 serves a second cell 122, and the third radio network node 113 serves a third cell 123.

The wireless communications network 100 comprises a first wireless device 131. The wireless communications network 100 may have also comprised in a past time period, or may comprise in a contemporaneous time period to the presence of the first wireless device 131, one or more second wireless devices 132 and/or one or more third wireless devices 133. In the non-limiting example scenario of FIG. 4, the one or more second wireless devices 132 and the one or more third wireless devices 133 have been comprised in the wireless communications network 100 in a previous time period, and are therefore represented with dotted lines. In the non-limiting example scenario of FIG. 4 three second wireless devices 132, and three third wireless devices, respectively 133 are represented for illustrative purposes only. The number of one or more second wireless devices 132 and/or the one or more third wireless devices 133 may vary. Any of the first wireless device 131, the one or more second wireless devices 132 and/or the one or more third wireless devices 133 may be also known as e.g., a UE, mobile terminal, wireless terminal and/or mobile station, mobile telephone, cellular telephone, or laptop with wireless capability, or a Customer Premises Equipment (CPE), just to mention some further examples. Any of the first wireless device 131, the one or more second wireless devices 132 and/or the one or more third wireless devices 133 in the present context may be, for example, portable, pocket-storable, hand-held, computer-comprised, or a vehicle-mounted mobile device, enabled to communicate voice and/or data, via a RAN, with another entity, such as a server, a laptop, a Personal Digital Assistant (PDA), or a tablet computer, sometimes referred to as a tablet with wireless capability, or simply tablet, a Machine-to-Machine (M2M) device, a device equipped with a wireless interface, such as a printer or a file storage device, modem, Laptop Embedded Equipped (LEE), Laptop Mounted Equipment (LME), USB dongles, CPE or any other radio network unit capable of communicating over a radio link in the wireless communications network 100. Any of the first wireless device 131, the one or more second wireless devices 132 and/or the one or more third wireless devices 133 may be wireless, i.e., it may be enabled to communicate wirelessly in the wireless communication network 100 and, in some particular examples, may be able support beamforming transmission. The communication may be performed e.g., between two devices, between a device and a network node, and/or between a device and a server. The communication may be performed e.g., via a RAN and possibly one or more core networks, comprised within the wireless communications network 100.

In some examples, some or all of the one or more second wireless devices 132 may be the same as some or all of the one or more third wireless devices 133. They are named differently to denote the two groups do not necessarily refer to the same wireless devices. The one or more second wireless devices 132 may comprise one or more simulated wireless devices. In some particular examples, the one or more second wireless devices 132 may comprise the simulated device, or simulated devices, and the one or more third wireless devices 133.

The first network node 101 may communicate with the first radio network node 111 over a first link 141, e.g., a radio link or a wired link. The first network node 101 may communicate with the second radio network node 112 over a second link 142, e.g., a radio link or a wired link. The first network node 101 may communicate with the third radio network node 113 over a third link 143, e.g., a radio link or a wired link. The first wireless device 131 may communicate with the first radio network node 111 over a fourth link 144, e.g., a radio link. The first wireless device 131 may communicate with the second radio network node 112 over a fifth link 145, e.g., a radio link. The first wireless device 131 may communicate with the third radio network node 113 over a sixth link 146, e.g., a radio link. Each of the first link 141, the second link 142, and the third link 143 may be a direct link or a comprise one or more links, e.g., via one or more other network nodes, radio network nodes or core network nodes.

Each of the one or more wireless devices 132, and/or the one or more third wireless devices 133 may communicate or have communicated with to any of the first radio network node 111, the second radio network node 112, and the third radio network node 113 with similar links to those described for the wireless device 131. These are not depicted in FIG. 4 to simplify it.

In general, the usage herein of "first", "second", "third", "fourth", "fifth" and/or "sixth" may be understood to be an arbitrary way to denote different elements, and may be understood to not confer a cumulative or chronological character to the elements they modify.

Figure 5:
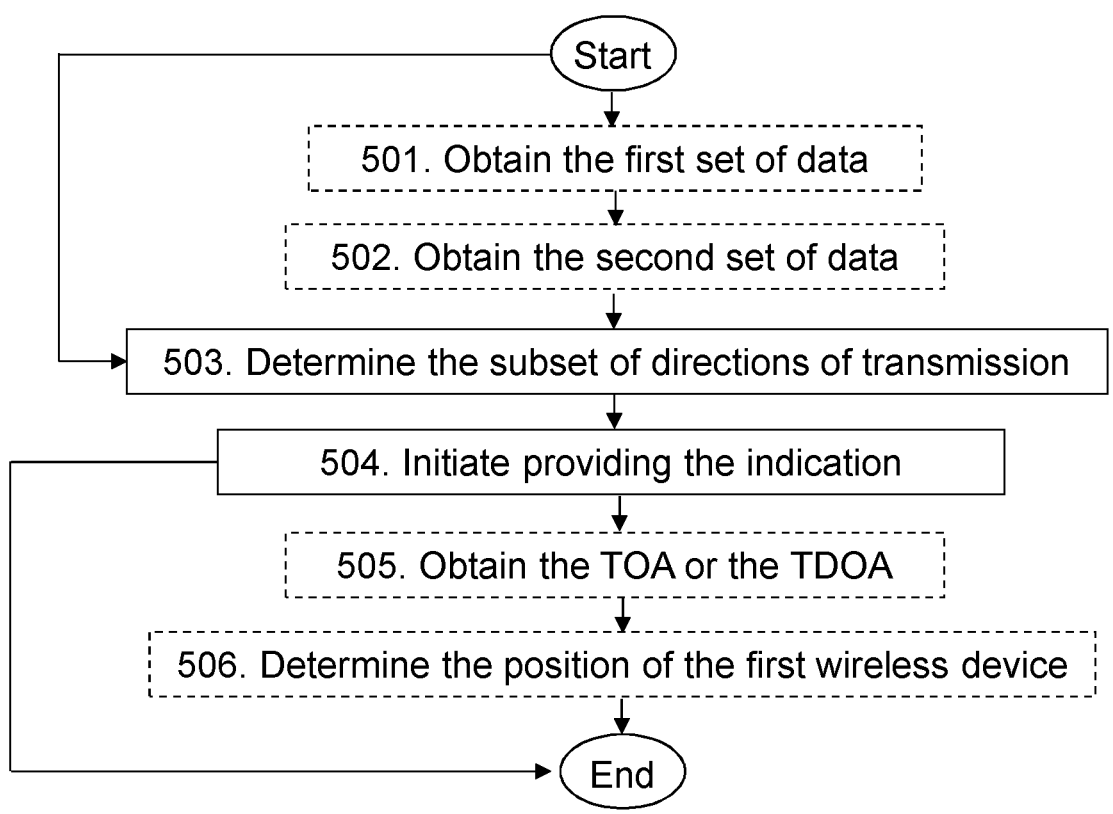
FIG. 5 is a flowchart depicting a method in a first network node, according to embodiments herein.

Embodiments of a method, performed by the first network node 101, will now be described with reference to the flowchart depicted in FIG. 5. The method may be understood to be for handling directions of transmission of beamformed beams by a first radio network node 111. The first network node 101 and the first radio network node 111 operate in the wireless communications network 100.

In some embodiments, all the actions may be performed. In some embodiments, some actions may be performed. One or more embodiments may be combined, where applicable. All possible combinations are not described to simplify the description. It should be noted that the examples herein are not mutually exclusive. Components from one embodiment may be tacitly assumed to be present in another embodiment and it will be obvious to a person skilled in the art how those components may be used in the other exemplary embodiments. In FIG. 5, optional actions are indicated with dashed lines. Some actions may be performed in a different order than that shown in FIG. 5.

Action 501

In the course of communications within the wireless communications network 100, the first network node 101 may at some point need to determine a location of the first wireless device 131. As described earlier, at least three radio network nodes, such as the first radio network node 111, the second radio network node 112, and the third radio network node 113, may need to be detected by the first wireless device 131 for 2D terminal positioning. Since the location of the first wireless device 131 to be positioned is not yet known at this stage, the first radio network node 111, the second radio network node 112 have no knowledge about where to point the beams in order to be detected by the first wireless device 131. The first radio network node 111, for example, is capable of transmitting the beamformed beams in a set of directions, e.g., each of the directions of the lobes transmitted by the first radio network node 111, as schematically represented in FIG. 4. The method is described herein in relation to first radio network node 111 to simplify the description. However, the method may be understood to similarly apply to each of the second radio network node 112 and the third radio network node 113. To avoid having to transmit the beams in all possible directions and test which are being detected by the first wireless device 131, it would be helpful to narrow down the number of beams to transmit to a smaller number of directions, that is, to a subset of directions from the set of possible directions. For that purpose, the first network node 101 may use data obtained from previous attempts of positioning other wireless devices, that is, the one or more second wireless devices 132, as will be described in the following actions.

In some embodiments, according to embodiments herein, the first network node 101 may perform data simulations, to try to estimate what subset of directions the first wireless device 131 may be able to detect, based on computer simulations of the directional properties of beams caused by propagation geometry in a particular space. At high frequencies, e.g., mmW beams, which may be used in 5G networks, obstacles in the path of the beams may cause beam reflections, beam diffraction and beam shadowing, a strong function of the geometry of the space, e.g., the first cell 121, where the transmissions of the beams may occur. Ray-tracing simulations may then be used using a computer simulated wireless device, referred to herein simply as a simulated wireless device, to estimate a probability of detection, by the simulated wireless device, of the beamformed beams in the set of directions. Ray-tracing may be understood as tracing of rays over a detailed map where the rays interact with objects on the map, e.g., a 3D city map or a 2D building floor layout. These interactions simulate the characteristics of radio waves at high frequencies, e.g., mmW band, and their interactions with the objects in a map.

According to the foregoing, in this Action 501, the first network node 101 may obtain, a first set of the data. The first set of the data may be understood as simulated data indicating an estimated probability of detection, by the simulated wireless device, of the beamformed beams in the set of directions, as estimated by ray-tracing simulations.

Obtaining may be understood as determining, calculating, generating, retrieving from a memory, or receiving from another network node in the wireless communications network 100, e.g., the second network node 102.

The probability of detection may be a probability of performing at least one of: a Time of Arrival (TOA) measurement, and a Time Difference of Arrival (TDOA) measurement. The performance may be understood as a successful performance.

The estimated probability of detection may be based on a simulated number of detected directions by the simulated wireless device, as based on the ray-tracing simulations. The first set of data may therefore be, for example, a first histogram, or a corresponding set of data, such as a first vector or matrix of directions and respective number of simulated detections. This will be now illustrated with an example.

EXAMPLE

Figure 6:
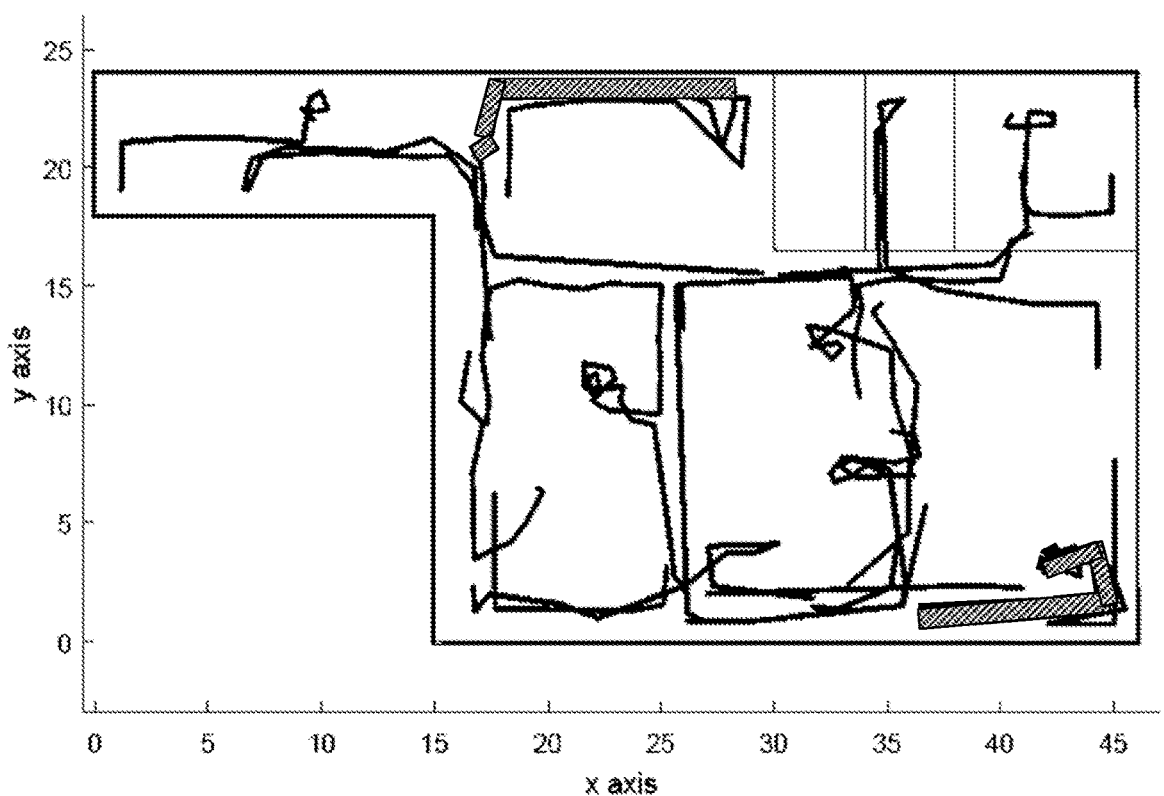
FIG. 6 is a schematic diagram illustrating cell geometry and user paths, according to an example of embodiments herein.

In order to describe the example, ongoing beam tracking processes at mmW frequencies in a cell is first assumed. The beam tracking may be understood to be, due to beam reflections, beam diffraction and beam shadowing, a strong function of the geometry of the cell, in this case an indoor cell depicted in FIG. 6, together with simulated user trajectories. The physical barriers around and within the indoor cell of FIG. 6 are illustrated with straight lines. The simulated trajectories of the third wireless device are illustrated in wiggle lines. The striped trajectories represent two examples of individual user trajectories.

The simulations here are first performed using an indoor scenario in which several users are connected to one base station, e.g., a gNB, which is not depicted in FIG. 6. The purpose is to explain the buildup and origin of the first set of the data, e.g., the histogram information, and to illustrate the strong directional effects created by obstacles at high mmW carrier frequencies.

The carrier frequency is 28 GHz, and it is assumed the users do not use beamformed beams and have equal signal sensitivity in all directions. The base stations use beamforming with beams generated with an 8×8 planar array that may be steered in any direction.

New users may turn up in a cell in a variety of ways. The mobile may be turned on in the cell, users may turn up entering the cells around a corner, or by opening a door. That means that some ways to generate initial beam directions may be partly random in terms of the location, while others may appear more regularly depending on the geometry of the cell. A probability map may therefore be built up by introducing a grid, where the initial angle of a first beam is added as an event to the first set of the data, in this example, a histogram, on the grid. A grid may be understood as follows. If the space of all possible beam directions is considered, e.g., azimuth from 0 degree to 360 degree, the grid may be understood to be over this range of azimuth angles. The grid may also refer to a grid over azimuth and elevation angles.

Figure 7:
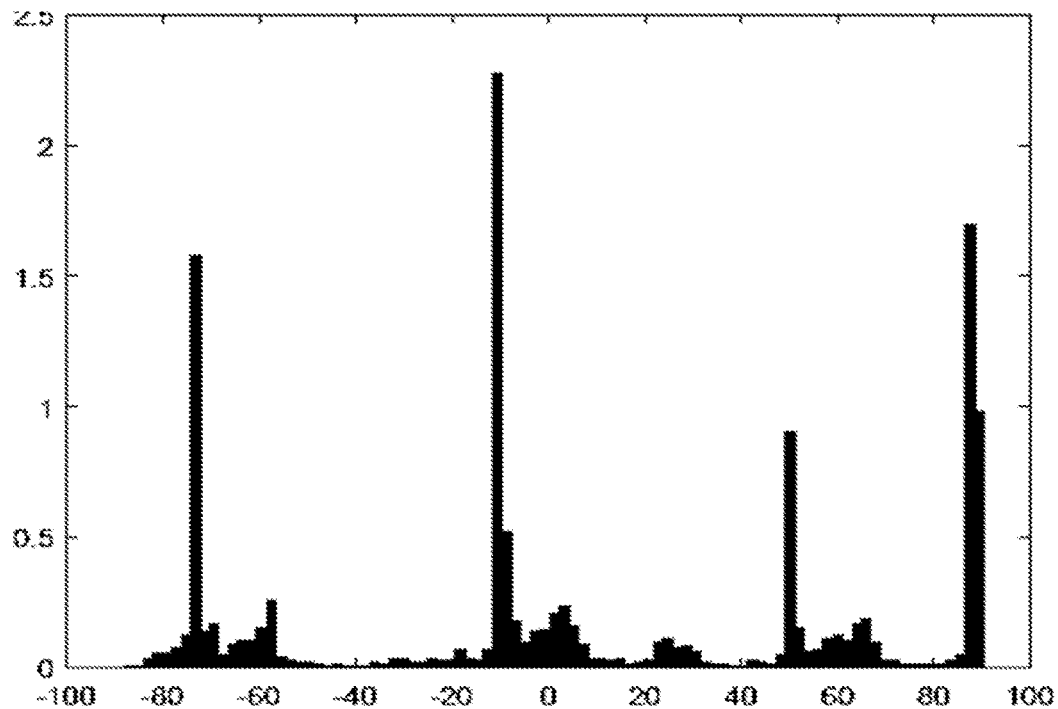
FIG. 7 is a beam direction histogram for a site position FIG. 6.

An example of such a histogram is illustrated in FIG. 7, where the x-axis covers directions in [−90 deg, +90 deg], however that range is by no means a necessity. The y axis shows the number of detections. In reference to the geometry of FIG. 6, it may be expected that this histogram has a peak roughly at −15 degrees, since the base station is located at x=0, y=22. Minus 15 (−15) degrees represents the angle where users get into line of sight of the gNB. Thus, there is a first level of the histogram corresponding to beams pointing to most likely or more frequent UE locations. The level may be understood to refer to the bars in the histograms that are above a given threshold. In FIG. 7, only a few directions have high occurrence over such threshold. There may also be a background level of the histogram, that is, a second level of the histogram, corresponding to beams that may be seen by the UEs anywhere in the cell. The beams of the first level may be narrower than the beams from the second level of the histogram. Also, the beams corresponding to the first level of the histogram may be configured or turned on at least once within shorter time intervals T1, or with a more frequent periodicity P1 compared to those T2 and P2 for the beams corresponding to the second level of the histogram.

As may observed in FIG. 7, for many directions, the likelihood of a user being found in that direction is very low. Hence, the most probable directions may comprise the first level of the histogram.

As illustrated in this example, the first network node 101 may obtain the first set of the data, by building a model of the detailed propagation geometry of the beamformed beams transmitted by the first radio network node 111 similar to the example depicted in FIG. 6, followed by detailed ray-tracing propagation simulation. A detailed propagation geometry may be understood to require a map of the elements that may interact with the radio waves. This may comprise the location of objects that may produce reflections and/or shadowing, e.g., walls, trees, etc. Raytracing, as mention earlier, may be understood as a technique to simulate the characteristics of the radio waves at mmW frequencies. Thus, a map may be generated first, e.g., by the first node 101, and then a simulation may be performed, e.g., by the first node 101, of how the radio waves may be expected to propagate on the map. The model may later be used to narrow down the set of directions in which the first radio network node 111 is capable of transmitting the beamformed beams in order to estimate the position of the first wireless device 131.

The first set of the data may be obtained by a) UE-assisted, and/or b) UE-based scanning. For the UE-assisted scanning, it may be assumed that the UE in question, e.g., the simulated wireless device, may be able to report back separate TOA detections for each site, e.g., any of the first radio network node 111, the second radio network node 112, and the third radio network node 113. For the UE-based scanning, the scanning may be understood to be performed without signalling of the successful TOA detections per site. The first set of the data may also be obtained per site, that is, per radio network node, or based on multi-site, that is, based on the simultaneous detection of more than one site at a time. Since some of the details on the obtaining of the first set of the data may also apply to the obtaining of a second set of data described in the next Action 502, these common further details on the performance of this Action 501 will be provided in the section entitled Phases of the obtaining of the first set of data and/or the second set of the data.

Action 502

The first network node 101 may not only use simulated data to try to estimate the subset of directions of transmission of the beamformed beams transmitted by the first radio network node 111 the first wireless device 131 may be able to detect, but also observed, real data. For example, the one or more third wireless devices 133 may be used as test UEs in the cell of interest, e.g., the first cell 121 for the first radio network node 111. The UEs may be moved around the cell in a representative way, and allowed to perform OTDOA positionings, while their reported data is collected.

In this Action 502, the first network node 101 may obtain a second set of the data, e.g., a second histogram, a second matrix, or a second group of histograms, or a second group of matrices. The second set of the data may be understood to comprise historical data indicating an observed probability of detection, by the one or more third wireless devices 133 operating in the wireless communications network 100, of the beamformed beams in another subset of the set of directions.

In some examples, the second set of the data may be understood to comprise historical data indicating an observed probability of detection, by the one or more third wireless devices 133 operating in the wireless communications network 100, of the beamformed beams in another subset of the set of directions, being above a threshold.

In some examples, the another subset of the set of directions may be the same as the full set of directions. In other examples, the another subset of the set of directions may be understood to be different than the full set of possible directions, since the observed data may be obtained after having initialized the performance of the method with the simulated data obtained in Action 501, which may be understood to have reduced the full set of directions to another, smaller, subset. That is, the historical data may have been collected based on the full set of directions in which the first radio network node 111 is capable of transmitting the beamformed beams.

Phases of the Obtaining of the First Set of Data and/or the Second Set of the Data.

The obtaining of either the first set of the data, the second set of the data, or both, in may in itself comprise a first phase and a second phase. In the first phase, which is referred to herein as a baseline phase, a first subset of the any of the sets of the data may be obtained without taking advantage of historical data. In a second phase, a second subset of the any of the sets of the data may be obtained using historical data. In the first phase, the scanning performed by the first network node 101 may be a) UE-assisted, and/or b) UE-based. For the UE-assisted scanning, it may be assumed that the one or more second wireless devices 132 used may be able to report back separate TOA detections for each site, e.g., each of the first radio network node 111, the second radio network node 112, and the third radio network node 113. For the UE-based scanning, the scanning may be understood to be performed without signalling of the successful TOA detections per site.

These two phases will now be described in further detail using histograms as an illustrative example of data sets, or data subset. Any of the description provided may be understood to apply to the simulated wireless device or to the one or more third wireless devices 133, unless otherwise specifically noted.

First Phase of Action 501 and/or Action 502: Baseline Scanning Strategies

The following baseline beam scanning strategies may be understood to not take advantage of previous attempts of positioning, e.g., what will be later described as learned histogram information. They may be, however, the starting point for the algorithms that analyse the information provided by the baseline strategies and that exploit the patterns found within such information. In other words, the baseline scanning may be used to provide data for the histograms described herein.

1.a) a Baseline UE Assisted Scanning Strategy

The first alternative may be UE assisted in that it may be assumed that the UE, which may be any of the simulated device, or one or more third wireless devices 133, may report back separate TOA detections for each site. Then:

1.a i) As a first step, each involved base station, e.g., any of the first radio network node 111, the second radio network node 112, and the third radio network node 113, may scan its selected beamspace individually by transmitting PRSs, that is, transmitting PRS via beams comprised in its selected beamspace. It may also be ensured that only one site in some local area is transmitting at a time. The UE may then report back when a time of arrival is successfully detected. This scanning may be used for preparation for the second step:

1.a.ii) All combinations over the involved positioning sites of the successful detections may be scanned with transmission of PRSs from the involved sites, coordinated in time. The UE may then perform simultaneous detection of TOAs for multiple sites which may be needed for position calculation.

As will be seen next, an exponential complexity in the number of sites will otherwise affect the OTDOA positioning methods. In other words, the time needed to perform the OTDOA positioning methods may be affected by exponential complexity in the number of sites. It may be noted that reporting of TOA information for a single site may be needed in the above algorithm.

1.b) a Baseline UE Based Scanning Strategy

In case of a strictly UE based position calculation, without signaling of the successful TOA detections per site, the directions to transmit PRS in case of OTDOA may be understood to not be known at the transmitting site, especially at neighbor sites. What remains may be therefore to perform a complete scan over all possible combinations of beam directions of all involved positioning sites. If it is assumed that there are K sites each equipped with an array allowing $N_i$, $i=1, \ldots, K$, beam directions, a complete beam scan with coordinated transmission of PRSs may require that:

$$N_{tot} = N_1 \times N_2 \times \ldots \times N_K$$

coordinated transmissions may need to be performed. In case a good solution is found after half the number of directions for each site has been scanned, the above number may be reduced accordingly. To see that this exponential complexity quickly becomes infeasible with the number of sites growing, an example is useful. Therefore, if 3 sites are considered, with antenna arrays allowing 64 beam directions, and 1 coordinated transmission is assumed to be able to be performed per ms. Then, a scan of half the number of directions per site requires 32 seconds, which is not consistent with E-911 requirements aiming for a positioning time of 30 s.

2. Second Phase of Action 501 and/or Action 502: Obtaining of the Sets of the Data Using Prior Positionings To illustrate the features of the obtaining of the sets of the data, histograms will be used here as an example of the sets of data. Obtaining the sets of the data, may therefore comprise generating one or more histograms. The histograms may be first initialized with, e.g., results of the baseline scanning data, and then updated as new data points for the sets of data may be obtained. In other words, embodiments herein allow to incorporate information of successful positioning requests beyond the information collected during the histogram initialization. The first network node 101 may continue to learn histogram information continuously with each new successful positioning request from any of the one or more second wireless devices 132, whenever the positioning information may be reported back to the network. This may be referred to as an "online histogram update".

2.a) Data Sources for Online Histogram Update

When learning histograms to be used for positioning purposes such as the positioning of the first wireless device 131, the general directional information related to the UE tracking scenario described so far in relation to Action 501, or to Action 502 may need to be restricted further. More precisely, the histograms may need to be based on directional data related only to previous positionings, or even OTDOA positionings, because, e.g., the signal coverage needed for positioning may be understood to be typically different from that what may be needed for mobility or Radio Mobility Management (RMM) in general.

Given the UE assisted scanning strategy, the following sources of data may be used.

2.a i) In a first step the obtaining of the sets of data may result in per site directions, for which successful time of arrival detection was obtained. That is, in the first step, the probabilities for a given radio network node may be understood to not depend on the measurement from other radio network nodes. Then, successful time of arrival measurements may be reported by the UE, e.g., any of the second wireless devices 132, without taking into account measurements taken from other radio network nodes. It may be understood that there may be no need to save in the database the fact that the measurements from the first radio network node 111 are related to the measurement taken by the same UE from the second radio network node 112, or from the radio network node 113. The first method may therefore be understood to require less information from the any of the second wireless devices 132.

2.a ii) In the second step, a successful position calculation may build on a number of time of arrival detections, each associated with a beam direction of the involved site. In the second step, there may be understood to be a need that the same UE, that is, any of the second wireless devices 132, reports successful measurements from at least two radio network nodes. These measurements may need to be taken by the same second wireless device 132 at the same location. The difference between the two approaches may be understood to start from the moment that the measurements are taken and the data is collected. These beam directions may be understood to provide a more accurate source of information that may be used to update the histogram information for the sites associated with the beam directions for which the time of arrival detections were made.

2.b) Information Sources for Initialization of Histogram Information

When the method is started, it may be understood that no data has been collected and the histograms may not contain any information. At that point of time, the problems with existing methods discussed above remain. In order to improve performance from the start, other sources of prior information may be needed that may then be used to initialize the histograms. To initialize the histograms may be understood as to assign a value to the counters stored in each of the elements in a multidimensional set of data, e.g. histograms, before these histograms are used for the first time, to determine a subset of directions to transmit. The baseline scanning described before may be used to provide information to initialize the histograms. According to embodiments herein, this other prior information may be generated based on one or more of the following sources:

2.b. i) The model of the detailed propagation geometry that may have been constructed as described above in relation to FIG. 6, followed by detailed ray-tracing propagation simulation, as explained in relation to Action 501. Then, simulated UEs, similar to the simulated wireless device, in that environment may be used to initialize the sets of data, e.g., histograms, assuming that OTDOA positionings may be performed. In order to obtain a more robust initialization, the same background value may be added to all histogram bins. Herein, the term bin may be understood to refer to a counter corresponding an event in a histogram. The background value may be understood to allow to assign an initial value, e.g., a count, to the each bin in the histograms. It may be understood as a mathematical way to indicate that all events represented by the histograms are assumed to be equally likely. Such assumptions may be usually made when no other prior information is available. This background value may need to be selected small enough so that the first radio network node 111, the second radio network node 112 and the third radio network node 113 do not end up searching the whole space. That is, the space of all possible beam directions.

2.b. ii) The second set of data obtained from some of the one or more second wireless devices 132, o similar test UEs in the cell of interest, may be used to initialize the histograms, moving around the cell in a representative way, and performing OTDOA positionings. In order to obtain a more robust initialization, the same background value may be added to all histogram bins. This background value may need to be selected small enough so that the first radio network node 111, the second radio network node 112 and the third radio network node 113 do not end up searching the whole space.

Below, any of the two above, or similar other initialization embodiments, are denoted "histogram initialization" in the non-limiting example algorithms below.

Example 1: OTDOA UE Assisted Per Site Histogram Generation

The algorithm for per-site histogram generation for the UE assisted scanning strategy may become the following, for each cell the UE is located in ---
Histogram initialization
For all transmission times of step 1 of the UE assisted scanning
For i = 1, . . . , K
For j = 1, . . . , $N_i$
if (detected TOA in direction j)
Send TOA, direction and associated information like SINR for
histogram update
   Histogram(i, j) = Histogram(i, j) + 1
   End
  End
 End
---

The cell identity (ID), and thereby the cell of the UE, may be assumed to be known when TDOA positioning may be to be performed. Even cell portion may be known, e.g., from Enhanced Cell ID (E-CID). Note that the histograms may be one dimensional, one per site. Note that in case of 2D beamforming, that is, azimuth and elevation, the index may j run over all possible 2D beam directions.

FIG. 8-FIG. 12 show how this may turn out with a first set of the data, that is, simulated data, obtained according to Action 501. The non-limiting examples depicted in FIG. 8-FIG. 12, assume four different site locations in the geometry defined in FIG. 6.

Figure 8:
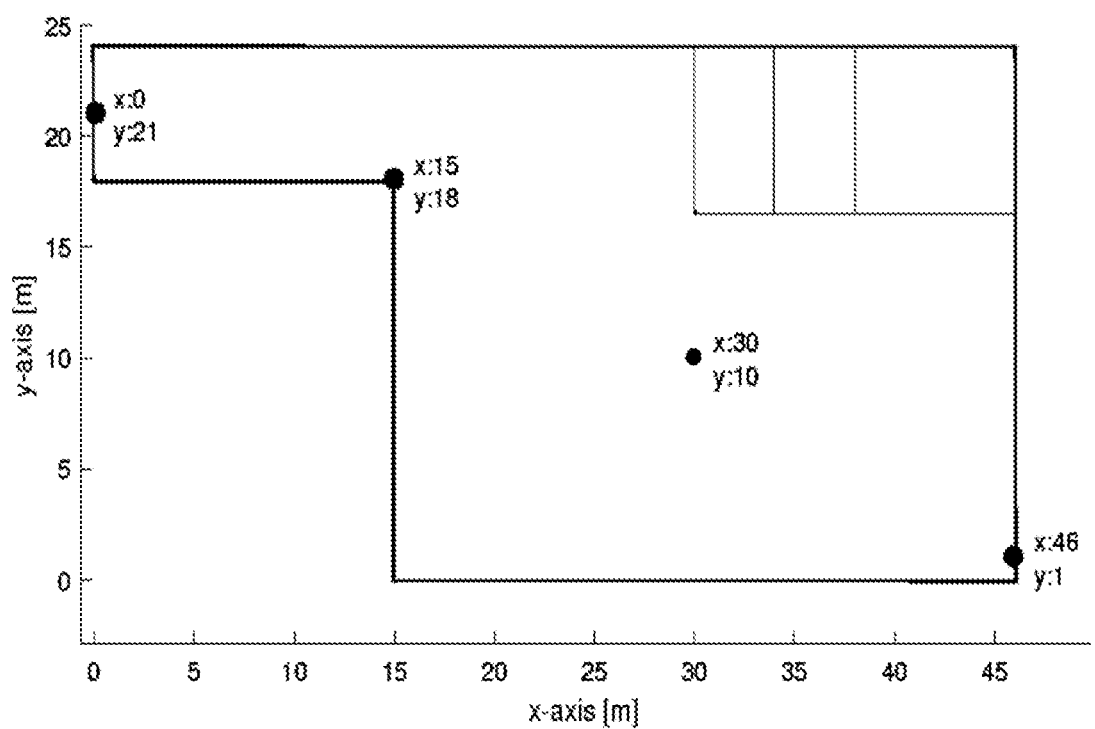
FIG. 8 is a schematic diagram illustrating the site locations and geometry of mmW simulations, according to embodiments herein.

FIG. 8 is a schematic diagram illustrating the site locations and geometry of the mmW simulations. The filled circles indicate the site positions. In each of FIG. 9-FIG. 12, the x axis represents the azimuth angle in degrees and the y axis represents the number of times a beam has been detected in the corresponding azimuth angle.

Figure 9:
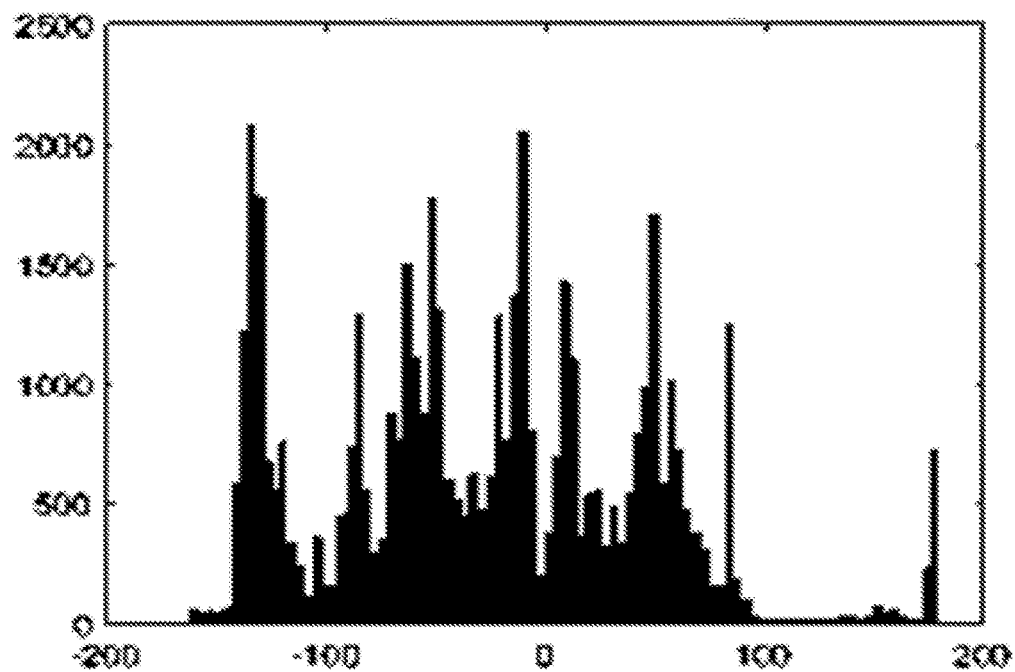
FIG. 9 is a beam direction histogram for site position x=15, y=18 in FIG. 8.

FIG. 9 is a beam direction histogram for site position x=15, y=18 in FIG. 8.

Figure 10:
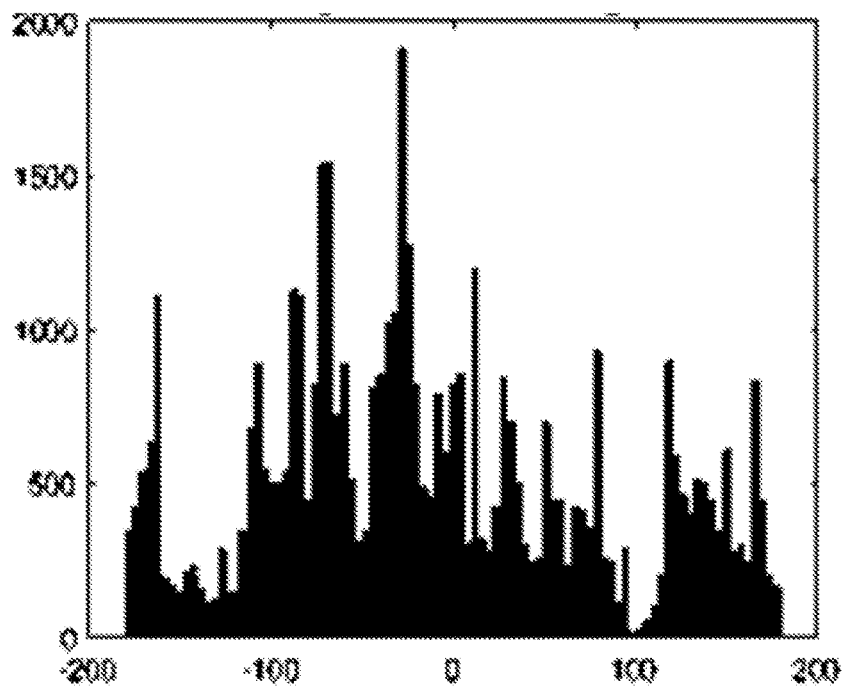
FIG. 10 is a beam direction histogram for site position x=30, y=10 in FIG. 8.

FIG. 10 is a beam direction histogram for site position x=30, y=10 in FIG. 8.

Figure 11:
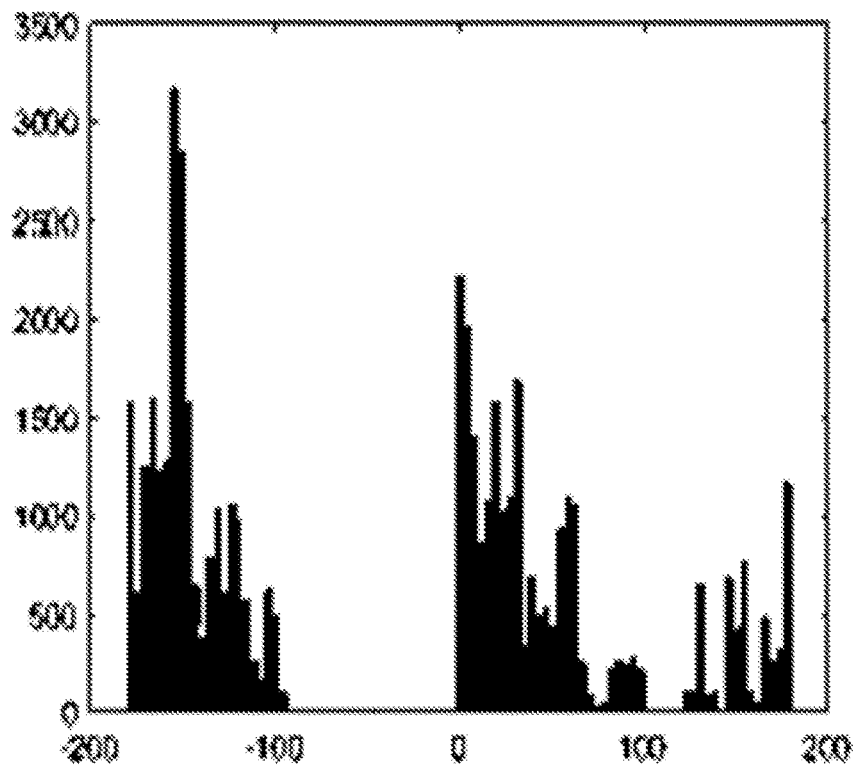
FIG. 11 is a beam direction histogram for site position x=46, y=1 in FIG. 8.

FIG. 11 is a beam direction histogram for site position x=46, y=1 in FIG. 8.

Figure 12:
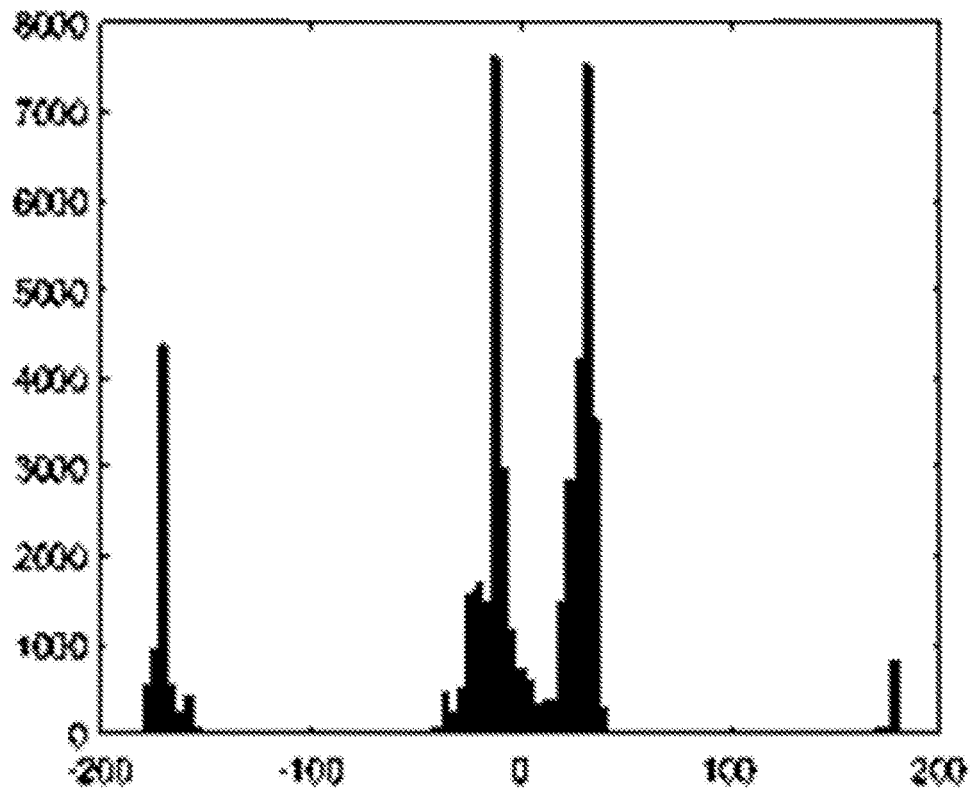
FIG. 12 is a beam direction histogram for site position x=0, y=21 in FIG. 8.

FIG. 12 is a beam direction histogram for site position x=0, y=21 in FIG. 8.

The conclusion that may be drawn from the examples of FIG. 8-FIG. 12 is that many directions seem to have very low priorities, and may therefore be scanned with low priority, in the background. That is, that other directions may be scanned not as frequently as more used directions. Note that the histograms may easily be transformed to experimental discrete probability density functions, by a normalization of the histogram bins with the total number of detections for each histogram.

Example 2: UE Assisted, Multi-Site Joint Histogram Generation

In the UE assisted case, the only source of information may be understood to be provided by the simultaneous detection of TOAs for multiple sites, which may be needed for position calculation.

It may be necessary to assume that the beam directions applied for the successful positioning may become known at the transmitting/receiving base stations, or at least in the positioning node. This follows since otherwise it may not be possible for the histogram information to be updated.

To explain this feature, the related but not equivalent single site UE tracking case of FIG. 6 is revisited. There, the relationship between the angles of a first beam and the angles of secondary beams that were being tracked for the same user were studied. The simulation represented by FIG. 6 was used to build up a two dimensional histogram that describes the joint likelihood of the azimuth directions of a first and secondary beam. The obtained histogram is depicted in FIG. 13 and FIG. 14.

Figure 13:
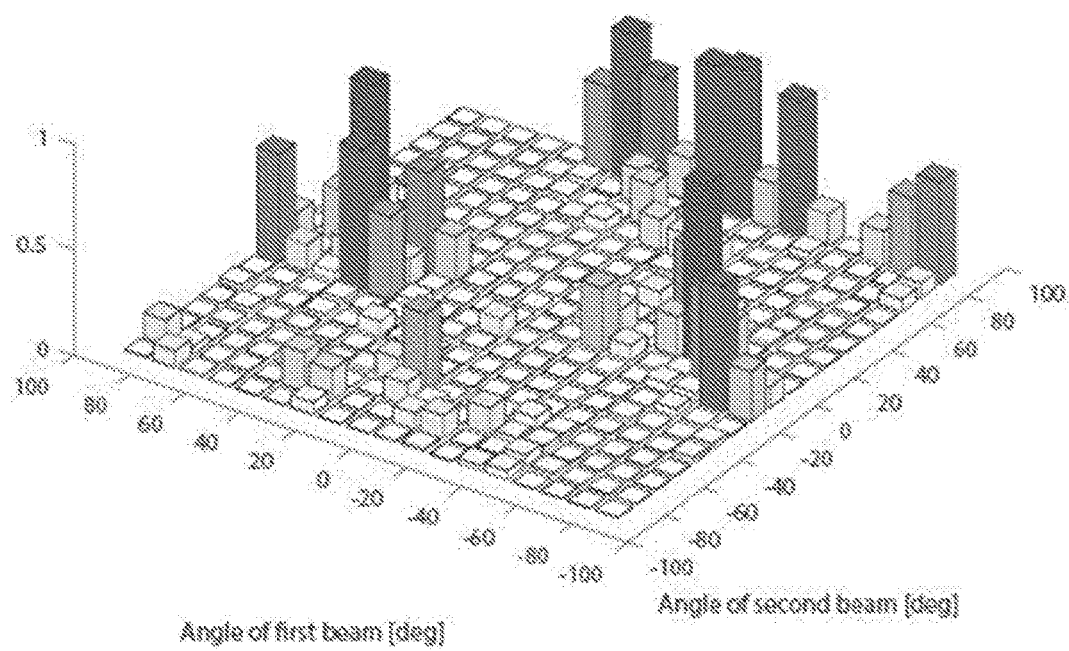
FIG. 13 is a three-dimensional histogram of the joint likelihood of a first and second beam direction, according to embodiments herein.

FIG. 13 is a three-dimensional histogram of the joint likelihood of a first and second beam direction. In FIG. 13, the right horizontal axis depicts azimuth angle of a second beam. The left horizontal axis depicts the azimuth angle of a first beam, and the vertical axis depicts the probability that the secondary beam is at a given angle conditioned to that the azimuth angle of the first beam is known. For representation purposes, in the example of FIG. 13, the higher the probability, the denser the pattern in the bars represented, and therefore, the darker the color.

Figure 14:
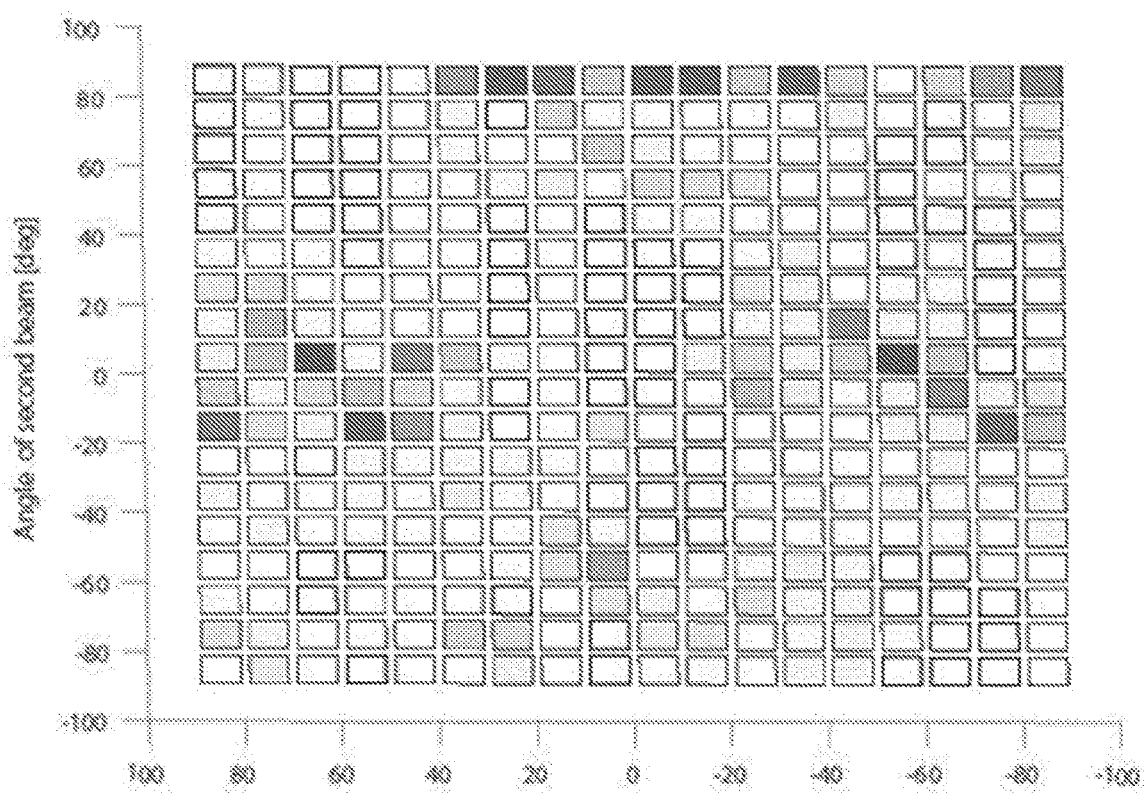
FIG. 14 is a two-dimensional histogram of the joint likelihood of a first and second beam direction, according to embodiments herein.

FIG. 14 depicts the same values of the joint likelihood of a first and second beam direction, in a two-dimensional histogram. For representation purposes, in the example of FIG. 14, the higher the probability, the denser the pattern in the bins represented, and therefore, the darker the color.

Again, the buildup procedure may be as follows. The bin of the histogram may be increased by 1, that is, the histogram counter associated with a respective event is increased by 1, given, e.g., the registered azimuth angles of beam 1 and 2 of a user, at each selected time instance of histogram update. It may be noted that, in case a first beam direction is available, then the histogram may show that it is a good strategy to search for new beams primarily in the directions where the values in the bins of the histogram are large. It may be noted that in the example of FIG. 13 and FIG. 14, most of the histogram bins have very low values, meaning that only a small part of all beam directions may need to be scanned. The procedure is straightforward to extend to more sites than 2, although that case is not possible to visualize.

The algorithm for joint histogram generation for the UE based exhaustive scanning strategy may now be defined. Exhaustive scanning maybe understood to refer to a search over the space of all possible beam directions. In this case the joint histogram has K dimensions. The update algorithm may become the following, for each cell the UE, that is, any of the one or more second wireless devices 132, is located in:

---
Histogram initialization
For all successful positionings of the UE assisted scanning strategy
    Receive TOA, direction and associated information
        like SINR for histogram update
    For i = 1, . . . , K
    direction(i) = positioningDirection(i)
    end
    Histogram(direction(1), ... , direction(K))
    = Histogram(direction(1), . . . . , direction(K)) + 1
    End
    End
    End
---

The cell ID, and thereby the cell of the UE, may be assumed to be known when TDOA positioning may need to be performed. It may be noted that in case of 2D beamforming, the direction variables may take values over all possible 2D beam directions.

Action 503

In this Action 503, the first network node 101 determines, out of the set of directions in which the first radio network node 111 is capable of transmitting the beamformed beams, the subset of directions of transmission of the beamformed beams having the probability of detection above a threshold, by the first wireless device 131 operating in the wireless communications network 100. The determining in this Action 503 is based on data obtained from previous attempts of positioning the one or more second wireless devices 132 using at least some of the directions in the set of directions.

The Data

The data used in the determination of Action 503 may comprise one or more sets of data, e.g., one or more histograms, one or more matrices, etc. . . . . Based on any, or both, of Action 501 and Action 502, the first network node 101 may have narrowed down the set of directions in which the first radio network node 111 is capable of transmitting the beamformed beams, to at least some of these directions. Therefore, the data the determining in this Action 503 is based on may comprise the first set of the data obtained in Action 501, that is, simulated data, the second set of the data obtained in Action 502, that is, the real observed data, or both. As stated earlier, one or more second wireless devices 132 may the same as the one or more third wireless devices 133, or at partially overlap with the one or more third wireless devices 133.

The Threshold

The threshold may be understood to be configurable. The threshold may be understood to be set based on a probability that a beam direction may be useful to compute the position of a user, such as the first wireless device 131. This threshold may be considered a first threshold which may indirectly defines a "number" of beams over the threshold in the sets of data, e.g., the histograms. The threshold may be designed from a false alarm assumption, or determined from other information, such as a number of characteristics of the power of transmission, the type of radio network node, the type of the one or more third wireless devices 133, the geometric conditions of the first cell 121, etc. . . . . A false alarm may correspond to detection of a signal when there is only noise present. Therefore, the first threshold, may in turn be established based on the probabilities of false alarm detections, that is, a second threshold, which will be discussed later, in relation to FIG. 15. Both thresholds may be understood to be related by the number of beams to be scanned. Unless otherwise indicated, any reference herein to a threshold may be understood to refer to the first threshold.

The Subset

The subset of directions of transmission of the beamformed beams having the probability of detection above the threshold, may be understood to be a first subset, which may be referred to herein as the subset to directions to be used in a "priority scan". That is, the subset of directions having the highest probability of detection, according to the chosen threshold, by the first wireless device 131, and which may be used first when attempting to determine the position of the first wireless device 131. The determination of the first subset in this Action 503, may also be understood to result in the determination of a second set of directions out of the set of directions in which the first radio network node 111 is capable of transmitting the beamformed beams. That is, the remaining set of directions, which are not in the first subset. This second subset of directions may be understood to have the lowest probability of detection, according to the chosen threshold, by the first wireless device 131, and may be referred to herein as the subset to directions to be used in a "background scan", in which all directions may be used, but less frequently. The second subset of directions may, for example, be used when attempting to determine the position of the first wireless device 131 with the first subset does not succeed.

Repetition for Each Radio Network Node

So far, the description of the method has been provided in relation to the first radio network node 111. However, the same actions may be understood to be performed for each of the second radio network node 112 and the third radio network node 113. Any of the radio network nodes may be considered "sites".

The beamformed beams described so far may be considered first beamformed beams, the set of directions may be considered a first set of directions, the subset of directions may be considered a first subset of directions, the obtained data may be considered first obtained data, the probability of detection may be considered a first probability of detection, and the previous attempts may be considered first previous attempts. In some embodiments, the determining in Action 503 may further comprise determining one of the following. With respect to the second radio network node 112, out of a second set of directions in which a second radio network node 112 operating in the wireless communications network 100 may be understood to be capable of transmitting second beamformed beams, a second subset of directions of transmission of the second beamformed beams having a second probability of detection above the threshold, by the first wireless device 131. The determining in Action 503 of the second subset may be based on second data obtained from second previous attempts of positioning the one or more second wireless devices 132 using at least some of the directions in the second set of directions.

With respect to the third radio network node 113, out of a third set of directions in which a third radio network node 113 operating in the wireless communications network 100 may be understood to be capable of transmitting third beamformed beams, a third subset of directions of transmission of the third beamformed beams having a third probability of detection above the threshold, by the first wireless device 131. The determining in Action 503 of the third subset may be based on third data obtained from third previous attempts of positioning the one or more second wireless devices 132 using at least some of the directions in the third set of directions.

The Probability of Detection a) Per Site

According to the description provided earlier, in some embodiments, any probability of detection may be a probability of detection of an individual network node, that is, to be per site, as described above. This may be referred to as per-site, or one-dimensional.

b) Multi-Site

In other embodiments, wherein the beamformed beams may be the first beamformed beams, the set of directions may be the first set of directions, and wherein the second radio network node 112 operating in the wireless communications network 100 may be the capable of transmitting the second beamformed beams in the second set of directions of transmission, the probability of detection above the threshold by the first wireless device 131 may comprise a probability of joint detection, by the first wireless device 131, in the subset of directions of transmission of the first beamformed beams, of the second beamformed beams in the second subset of directions of transmission of the second set of directions of transmission of the second beamformed beams. That is, the probability of detection may be multi-site. In such embodiments, the previous attempts of positioning the one or more second wireless devices 132 may have further used at least some of the directions in the second set of directions, e.g., in case the second set has already been narrowed down, for example, by an initialization, as described above, and does not use all the possible directions the second network node is capable of transmitting in.

The joint detection may be understood to also be able to be based on joint detection by the first wireless device 131 of beamformed beams from three of more radio network nodes, e.g., the first radio network node 111, the second radio network node 112 and the third radio network node 113. That is, in some embodiments, wherein the third radio network node 113 operating in the wireless communications network 100 may be capable of transmitting third beamformed beams in the third set of directions of transmission, the probability of detection above the threshold by the first wireless device 131 may further comprise a further probability of joint detection, by the first wireless device 131, in the subset of directions of transmission of the first beamformed beams, of the third beamformed beams in the third subset of directions of transmission of the third set of directions of transmission of the third beamformed beams. In such embodiments the previous attempts of positioning the one or more second wireless devices 132 may have further used at least some of the directions in the third set of directions.

In such "multi-site" embodiments, the probability of detection above the threshold may be comprised in a set of probabilities, e.g., a joint histogram, wherein, each of the probabilities in the set of probabilities may be a respective fourth probability of joint detection, by the first wireless device 131, of a respective one of the first beamformed beams transmitted in a respective first direction and a respective one of the second beamformed beams transmitted in a respective second direction, being above the threshold.

b.1) Simulated Data

In some embodiments, the first set of the data may be simulated data indicating an estimated probability of joint detection, by the simulated wireless device, of the first beamformed beams in the first set of directions and the second beamformed beams in the second set of directions of, as estimated by ray-tracing simulations.

b.1) Observed Data

In some embodiments, the second set of the data may be historical data indicating an observed probability of joint detection, by the one or more third wireless devices, of the first beamformed beams in another first subset of the first set of directions and the second beamformed beams in another second subset of the second set directions, being above the threshold.

Action 504

In this Action 504, the first network node 101 initiates providing, to at least one of: the first radio network node 111 and the second network node 102 operating in the wireless communications network 100, an indication of the determined subset in Action 503.

To initiate providing may be understood as e.g., initiating sending. That is, to provide or send, e.g., via the first link 141, or to trigger or enable another network node, e.g., the second network node 102, to provide or send, e.g., via the third link 143.

The indication may be, for example, a instruction to transmit positioning reference signals in the determined subset e.g., "transmit PRS in directions $bin_1$, $bin_2$, $bin_3$".

Action 505

In some embodiments, the first network node 101 may, in this Action 505, obtain, from the first wireless device 131 operating in the wireless communications network 100 at least one of: a Time of Arrival (TOA) measurement, and a Time Difference of Arrival (TDOA) measurement, based on the determined subset of directions or, based on the determined first subset of directions, the determined second subset of directions, and the determined third subset of directions. That the obtaining of the TOA and/or the TDOA The obtaining in this Action 505 may be implemented by receiving the information, via the first radio network node 111, e.g., via the first link 141 and the fourth link 144, via the second radio network node 112, e.g., via the second link 142 and the fifth link 145, and via the third radio network node 113, e.g., via the third link 143 and the sixth link 146.

Action 506

In this Action 506, the first network node 101 may determine a position of the first wireless device 131 based on the obtained at least one of: the TOA measurement and the TDOA measurement, obtained in Action 505.

It may be noted that whenever a positioning attempt may be performed, the then available data, e.g., histogram information, about the likelihood of certain beam direction may be used. At the same time, after the positioning attempt may have been performed, the data, e.g., histograms may be updated with the information learned in the positioning attempt. In that way, the first network node 101 may learn about directions over time.

Examples of Scanning Algorithms, According to Action 503, and TDOA Positioning, According to Action 505, and Action 506

In the following examples, the numbering on the left hand margin refers to the Actions described above, as performed by the first network node 101.

Preconditions

As a prerequisite to the combined TDOA positioning algorithms and scanning strategies that are outlined below, the threshold may first need to be computed. As stated earlier, the purpose of the threshold may be understood to be to enable a selection on if the directions corresponding to a bin may need to be scanned with priority, that is, in a first place given the higher probability of detection by the first wireless device 131, or not. The threshold may be designed from a false alarm assumption, or determined from other information. The threshold is denoted th below. All histograms below are also assumed to be normalized by a division by the total number of entries in each histogram.

OTDOA, One-Dimensional Histogram Based Scanning

The algorithm is exemplified for 3 sites, i.e. for K=3. The generalization to an arbitrary number of sites may be considered to be straightforward, by addition of more nested loops. This algorithm may be understood to exploit the one-dimensional histograms, built up separately for each site.

```
503      % Priority scan...
         For j = 1, . . . , N_1
         bin_1 = Histogram(1, j)
         For k = 1, . . . , N_2
         bin_2 = Histogram(2, k)
         For l = 1, . . . , N_3
         bin_3 = Histogram(3, l)
         if (bin_1 > th and bin_2 > th and bin_3 > th)
504      transmit PRS in directions bin_1,bin_2,bin_3
505, 506 Attemp to to compute OTDOA position (UE or base station)
         if successful computation
         stop and exit
         end
         end
         end
         end
         end
         % Background scan...
         For j = 1, . . . , N_1
         bin_1 = Histogram(1, j)
         For k = 1, . . . , N_2
         bin_2 = Histogram(2, k)
         For l = 1, . . . , N_3
         bin_3 = Histogram(3, l)
         transmit PRS using beams in directions bin_1,bin_2,bin_3
         Attemp to to compute OTDOA position (UE or base station)
         if successful computation
         stop and exit
         end
         end
         end
         end
OTDOA, joint histogram based scanning strategy
```

The algorithm is exemplified for 3 sites, i.e. for K=3. The generalization to arbitrary number of sites may be considered to be straightforward, by addition of more nested loops. This algorithm may be understood to exploit the multi-dimensional joint histogram, built up for all sites involved.

```
        ⎧  % Priority scan. . .
        ⎪  For j = 1, . . . , N₁
        ⎪  For k = 1, . . . , N₂
503     ⎨  For l = 1, . . . , N₃
        ⎪  bin_{jkl} = Histogram(j, k, l)
        ⎪  if (bin_{jkl} > th)
        ⎩     Send order to sites to transmit PRS corresponding to bin_{jkl}
      ↙
   504
transmit PRS using beams from multiple sites corresponding to bin_{jkl}
      ↙  Attemp to to compute OTDOA position (UE or base station)
505, 506  if successful computation
          stop and exit
          end
          end
          end
          end
          end
          % Background scan. . .
          For j = 1, . . ., N₁
          For k = 1, . . . , N₂
          For l = 1, . . . , N₃
          bin_{jkl} = Histogram(j, k, l)
          Send order to sites to transmit PRS corresponding to bin_{jkl}
          transmit PRS using beams corresponding to bin_{jkl}
          Attemp to to compute OTDOA position
          if successful computation
          stop and exit
          end
          end
          end
          end
```

As an overall summary of selected aspects of the foregoing, embodiments herein may be understood to enable the construction of sets of data, e.g., histograms, quantifying the likelihood of UE presence per beam direction, where the beam directions are with respect to a first specific measuring/transmitting site, and a specific cell, and possibly also a part or a portion of the cell.

Additionally, embodiments herein may also enable the construction of multi-dimensional sets of data, e.g., histograms, quantifying the joint probability of UE presence per beam direction, of the involved multiple sites, and said specific cell, and possibly also said cell portion.

Further, embodiments herein may also enable adjusting the scanning strategy according to said sets of data, e.g., histograms, with the purpose of performing OTDOA positioning.

Moreover, embodiments herein may also enable computing a OTDOA based position of the UE, based on detected time of arrivals from K sites.

The details on how such maps may be built, and how they may be used have been described above.

Based on the foregoing, embodiments herein may also be understood to be related to:

i) Generation of histograms, characterizing the likelihood of strong-signal directions from OTDOA positioning sites for successful OTDOA measurements at UE locations, said generation being performed using beam direction data from previous OTDOA positioning attempts;

ii) OTDOA positioning, wherein a first set of scanned beams for TDOA positioning may be restricted to beam directions whose likelihood expressed by said histograms, exceed a threshold; and iii) OTDOA background positioning, wherein the remaining set of scanned beams is used for TDOA positioning, when no successful OTDOA position may have been determined in step ii).

One or more advantages of embodiments herein may be understood to be that they enable substantial savings in terms of reduced interference and scan time, in comparison with a method that does not use information according to embodiments herein, e.g., from the histograms. As may be appreciated in FIG. 9-12, for the UE assisted scanning strategy, in some histograms more than 75% of the bins have small values, while some histograms have small values in less than 25% of all bins. Hence, but setting a particular detection threshold, the radio network nodes may be enabled to refrain from transmitting in many directions of their respective set of directions, e.g., first set, second set and/or third set of directions.

For the UE based scanning strategy, the gains appear to be much larger. This is evident from FIG. 14 and FIG. 15. Already in the illustrated 2-dimensional example, about 10% of the bins have large values. This directly translates into a reduction of the scanning latency with a factor of 10. This is an extremely significant system gain, since the main impairment of scanning is considered to be the latency. In addition, this gain is expected to increase with the number of involved sites.

Another advantage of embodiments herein is that by selecting the second threshold, the number of bins to search may be correspondingly reduced. To quantify a gain in the reduction of the number bins to search, the probability of false alarm, the second threshold may be considered with power detection. A false alarm may correspond to detection of a signal when there is only noise present. Assuming complex signals, the statistics may be Chi-2 distributed. This gives:

$$P_{fa} = 1 - (1 - e^{-\frac{1}{2}SNR})^N$$

Here, $P_{fa}$ denotes the false alarm probability, SNR is the signal to noise ratio and N the number of bins to search. Computing the SNR for $P_{fa}=0.01$ results in FIG. 16, which shows the threshold with a line, as a function of the SNR and of the number of bins. Depending on the number of bins to search, the second threshold reduction may reach 1.5 dB for a reduction of the search space of a factor of 10.

Figure 15:
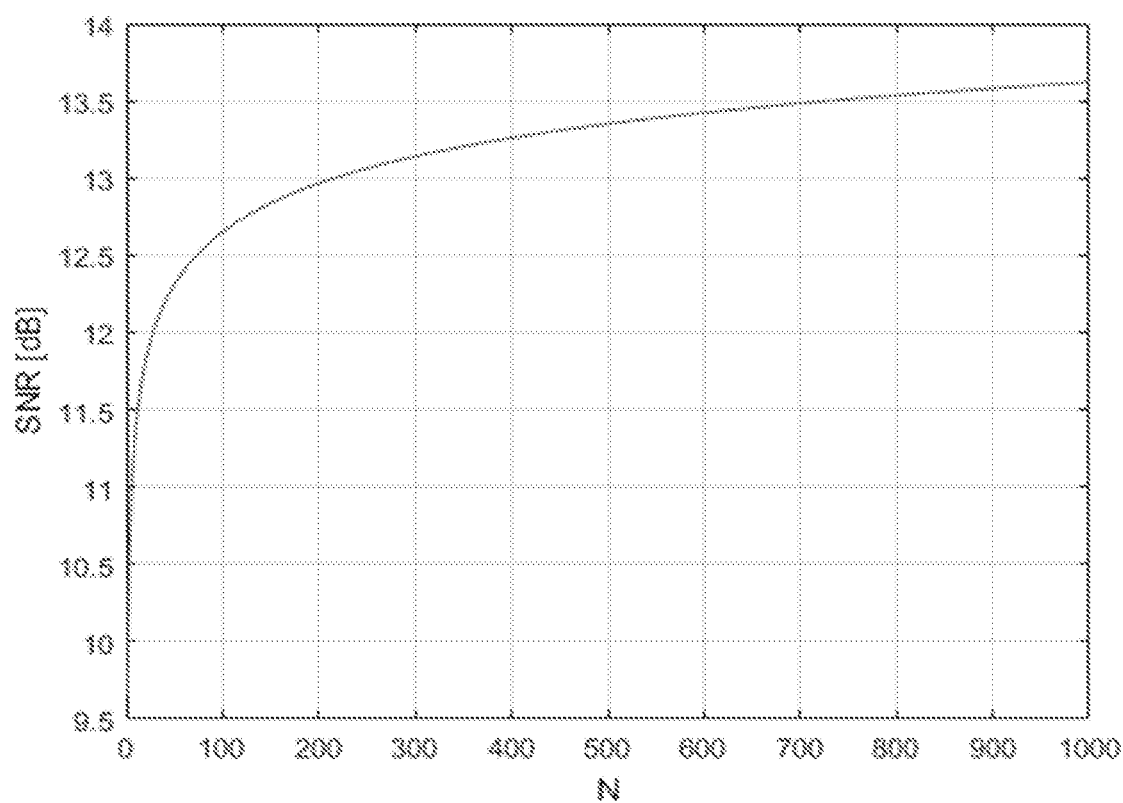
FIG. 15 is a diagram depicting a second threshold, that is, a false alarm detection threshold as a function of the dimension of the search space

FIG. 15 is a diagram depicting a false alarm detection threshold, also named herein a second threshold, as a function of the dimension of the search space.

Figure 16:
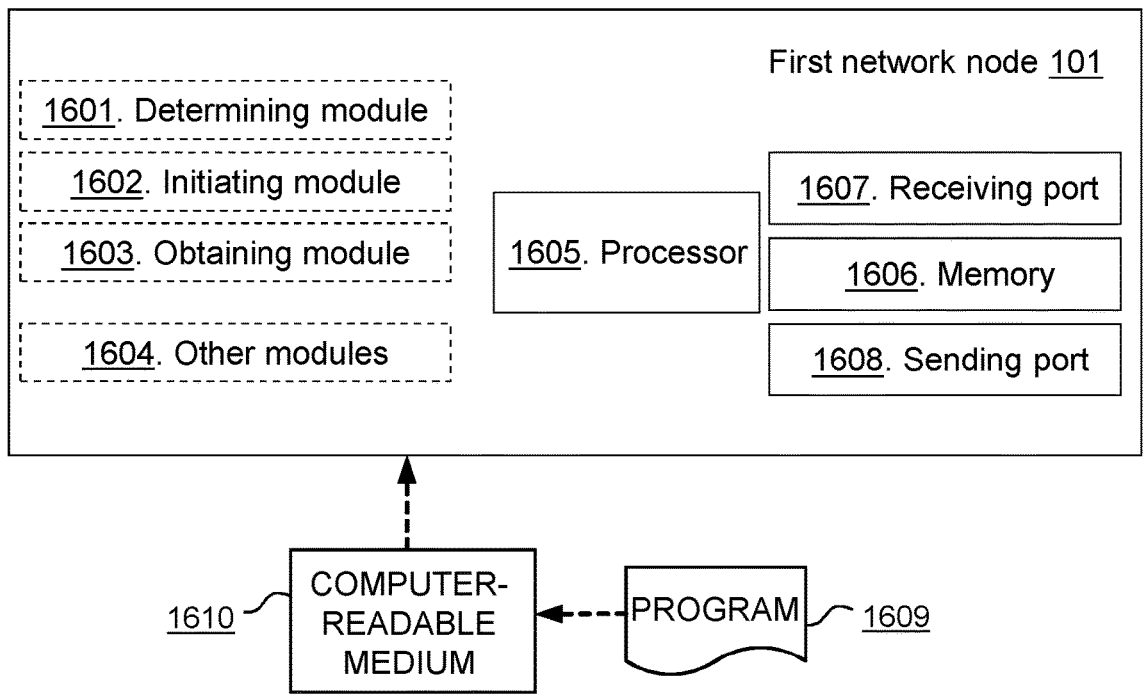
FIG. 16 is a schematic block diagram illustrating embodiments of a first network node, according to embodiments herein.
Figure 16:
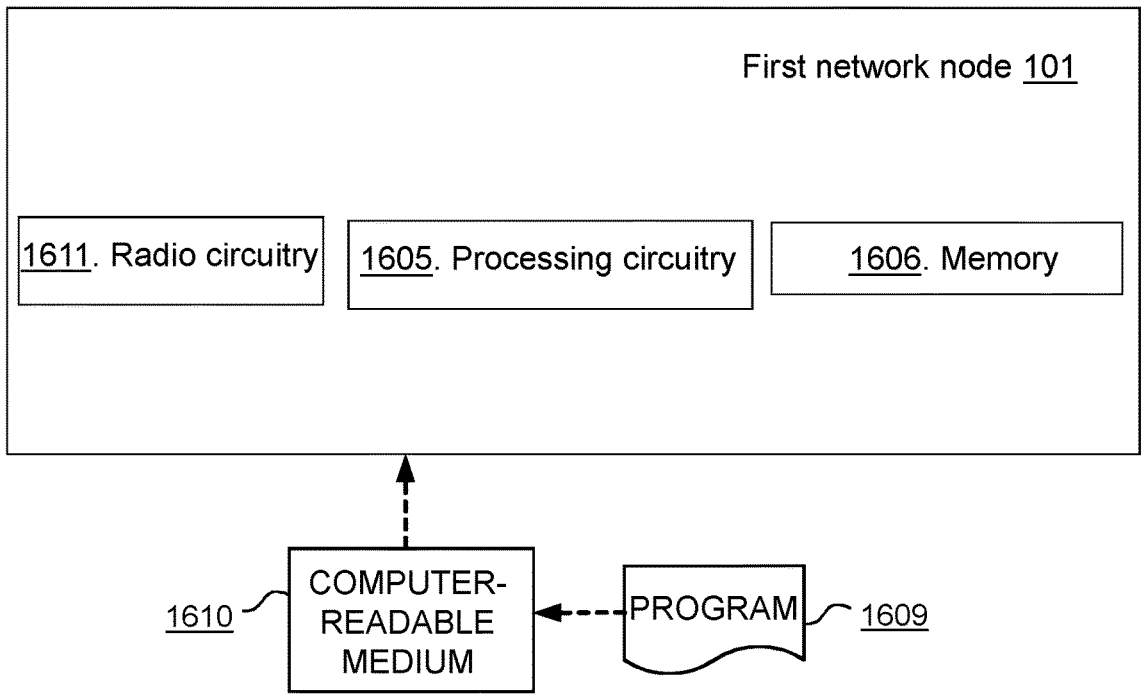

FIG. 16 depicts two different examples in panels a) and b), respectively, of the arrangement that the first network node 101 may comprise to perform the method actions described above in relation to FIG. 5, as e.g., further detailed in any of FIG. 6-FIG. 15. In some embodiments, the first network node 101 may comprise the following arrangement depicted in FIG. 16a. The first network node 101 is configured to handle directions of transmission of beamformed beams by the first radio network node 111. The first network node 101 and the first radio network node 111 are further configured to operate in the wireless communications network 100.

Several embodiments are comprised herein. Components from one embodiment may be tacitly assumed to be present in another embodiment and it will be obvious to a person skilled in the art how those components may be used in the other exemplary embodiments. The detailed description of some of the following corresponds to the same references provided above, in relation to the actions described for the first network node 101, and will thus not be repeated here. For example, the first network node 101 may be an E-SMLC and the first radio network node 111 may be a gNB.

In FIG. 16, optional modules are indicated with dashed boxes.

The first network node 101 is configured to, e.g. by means of a determining module 1601 within the first network node 101 configured to, determine, out of the set of directions in which the first radio network node 111 is configured to be capable of transmitting the beamformed beams, the subset of directions of transmission of the beamformed beams configured to have the probability of detection above the threshold, by the first wireless device 131 configured to operate in the wireless communications network 100. To determine is configured to be based on the data configured to be obtained from the previous attempts of positioning the one or more second wireless devices 132 using at least some of the directions in the set of directions.

The first network node 101 is further configured to, e.g. by means of an initiating module 1602 within the first network node 101 configured to, initiate providing, to at least one of: the first radio network node 111 and the second network node 102 configured to operate in the wireless communications network 100, the indication of the subset configured to be determined.

In some embodiments, the probability of detection may be configured to be the probability of performing at least one of: the TOA measurement, and the TDOA measurement.

The first network node 101 may be further configured to e.g. by means of an obtaining module 1603 within the first network node 101 configured to, obtain the first set of the data, the first set of the data being configured to be the simulated data configured to indicate the estimated probability of detection, by the simulated wireless device, of the beamformed beams in the set of directions, as configured to be estimated by the ray-tracing simulations.

In some embodiments, wherein the subset of directions is a first subset, the first network node 101 may be further configured to, e.g. by means of the obtaining module 1603 within the first network node 101 configured to, obtain the second set of the data. The second set of the data may be configured to be historical data configured to indicate the observed probability of detection, by the one or more third wireless devices 133 configured to operate in the wireless communications network 100, of the beamformed beams in the another subset of the set of directions.

In some examples, the second set of the data may be configured to be historical data configured to indicate the observed probability of detection, by the one or more third wireless devices 133 configured to operate in the wireless communications network 100, of the beamformed beams in the another subset of the set of directions, being above the threshold.

In some embodiments, wherein the beamformed beams are first beamformed beams, the set of directions is a first set of directions, the subset of directions is a first subset of directions, the obtained data is first obtained data, the probability of detection is a first probability of detection, and the previous attempts are first previous attempts, to determine may be configured to further comprise determining:

a. out of the second set of directions in which a second radio network node 112 configured to operate in the wireless communications network 100 is configured to be capable of transmitting second beamformed beams, the second subset of directions of transmission of the second beamformed beams being configured to have a second probability of detection above the threshold, by the first wireless device 131, the determining of the second subset being configured to be based on the second data configured to be obtained from the second previous attempts of positioning the one or more second wireless devices 132 configured to use at least some of the directions in the second set of directions; and b. out of the third set of directions in which a third radio network node 113 configured to operate in the wireless communications network 100 is configured to be capable of transmitting third beamformed beams, the third subset of directions of transmission of the third beamformed beams being configured to have the third probability of detection above the threshold, by the first wireless device 131, the determining of the third subset being configured to be based on third data configured to be obtained from third previous attempts of positioning the one or more second wireless devices 132 configured to use at least some of the directions in the third set of directions.

In some embodiments, the first network node 101 may be further configured to, e.g. by means of the obtaining module 1603 within the first network node 101, configured to obtain, from the first wireless device 131 configured to operate in the wireless communications network 100 at least one of: the TOA measurement, and the TDOA measurement, based on the first subset of directions configured to be determined, the second subset of directions configured to be determined and the third subset of directions configured to be determined.

The first network node 101 may be further configured to, e.g. by means of the determining module 1601 within the first network node 101 configured to, determine the position of the first wireless device 131 based on the configured to be obtained at least one of: the TOA measurement, and the TDOA measurement.

In some embodiments, any probability of detection may be configured to be the probability of detection of an individual network node.

In some embodiments, the beamformed beams are first beamformed beams, the set of directions is a first set of directions, and the second radio network node 112 configured to operate in the wireless communications network 100 is configured to be capable of transmitting second beamformed beams in the second set of directions of transmission, the probability of detection above the threshold by the first wireless device 131 may be configured to comprise the probability of joint detection, by the first wireless device 131, in the subset of directions of transmission of the first beamformed beams, of the second beamformed beams in the second subset of directions of transmission of the second set of directions of transmission of the second beamformed beams, and the previous attempts of positioning the one or more second wireless devices 132 may be configured to have further used at least some of the directions in the second set of directions.

In some embodiments, the probability of detection above the threshold may be configured to be comprised in a set of probabilities, each of the probabilities in the set of probabilities being the respective fourth probability of joint detection, by the first wireless device 131, of the respective one of the first beamformed beams transmitted in the respective first direction and the respective one of the second beamformed beams transmitted in the respective second direction, being above the threshold.

In some embodiments, the first set of the data may be configured to be simulated data configured to indicate the estimated probability of joint detection, by the simulated wireless device, of the first beamformed beams in the first set of directions and the second beamformed beams in the second set of directions of, as configured to be estimated by the ray-tracing simulations.

In some embodiments, the second set of the data may be configured to be historical data configured to indicate the observed probability of joint detection, by the one or more third wireless devices 133, of the first beamformed beams in the another first subset of the first set of directions and the second beamformed beams in the another second subset of the second set directions, being above the threshold.

In some embodiments, wherein the third radio network node 113 configured to operate in the wireless communications network 100 is configured to be capable of transmitting third beamformed beams in the third set of directions of transmission, and wherein the probability of detection above the threshold by the first wireless device 131 is configured to further comprise the further probability of joint detection, by the first wireless device 131, in the subset of directions of transmission of the first beamformed beams, of the third beamformed beams in the third subset of directions of transmission of the third set of directions of transmission of the third beamformed beams, the previous attempts of positioning the one or more second wireless devices 132 may be configured to have further used at least some of the directions in the third set of directions. In some of these embodiments, the first network node 101 may be further configured to, e.g. by means of the obtaining module 1603 within the first network node 101 configured to, obtain, from the first wireless device 131 configured to operate in the wireless communications network 100 at least one of: the TDOA measurement, and the TOA measurement, based on the subset of directions configured to be determined. The first network node 101 may be further configured to, e.g. by means of the determining module 1601 within the first network node 101 configured to, determine the position of the first wireless device 131 based on the configured to be obtained at least one of: the TDOA measurement, and the TOA measurement.

Other modules 1604 may be comprised in the first network node 101.

The embodiments herein in the first network node 101 may be implemented through one or more processors, such as a processor 1605 in the first network node 101 depicted in FIG. 16*a*, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the first network node 101. One such carrier may be in the form of a CD ROM disc. It is however feasible with other data carriers such as a memory stick. The computer program code may furthermore be provided as pure program code on a server and downloaded to the first network node 101.

The first network node 101 may further comprise a memory 1606 comprising one or more memory units. The memory 1606 is arranged to be used to store obtained information, store data, configurations, schedulings, and applications etc. to perform the methods herein when being executed in the first network node 101.

In some embodiments, the first network node 101 may receive information from, e.g., the first radio network node 111, the second radio network node 112, the third radio network node 113, or the second network node 102, through a receiving port 1607. In some embodiments, the receiving port 1607 may be, for example, connected to one or more antennas in first network node 101. In other embodiments, the first network node 101 may receive information from another structure in the wireless communications network 100 through the receiving port 1607. Since the receiving port 1607 may be in communication with the processor 1605, the receiving port 1607 may then send the received information to the processor 1605. The receiving port 1607 may also be configured to receive other information.

The processor 1605 in the first network node 101 may be further configured to transmit or send information to e.g., the first radio network node 111, the second radio network node 112, the third radio network node 113, or the second network node 102, or another structure in the wireless communications network 100, through a sending port 1608, which may be in communication with the processor 1605, and the memory 1606.

Those skilled in the art will also appreciate that the determining module 1601, the initiating module 1602, the obtaining module 1603, and the other modules 1604 described above may refer to a combination of analog and digital modules, and/or one or more processors configured with software and/or firmware, e.g., stored in memory, that, when executed by the one or more processors such as the processor 1605, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different modules 1601-1604 described above may be implemented as one or more applications running on one or more processors such as the processor 1605.

Thus, the methods according to the embodiments described herein for the first network node 101 may be respectively implemented by means of a computer program 1609 product, comprising instructions, i.e., software code portions, which, when executed on at least one processor 1605, cause the at least one processor 1605 to carry out the actions described herein, as performed by the first network node 101. The computer program 1609 product may be stored on a computer-readable storage medium 1610. The computer-readable storage medium 1610, having stored thereon the computer program 1609, may comprise instructions which, when executed on at least one processor 1605, cause the at least one processor 1605 to carry out the actions described herein, as performed by the first network node 101. In some embodiments, the computer-readable storage medium 1610 may be a non-transitory computer-readable storage medium, such as a CD ROM disc, or a memory stick. In other embodiments, the computer program 1609 product may be stored on a carrier containing the computer program 1609 just described, wherein the carrier is one of an electronic signal, optical signal, radio signal, or the computer-readable storage medium 1610, as described above.

The first network node 101 may comprise a communication interface configured to facilitate communications between the first network node 101 and other nodes or devices, e.g., the first radio network node 111, the second radio network node 112, the third radio network node 113, or the second network node 102. The interface may, for example, include a transceiver configured to transmit and receive radio signals over an air interface in accordance with a suitable standard.

In other embodiments, the first network node 101 may comprise the following arrangement depicted in FIG. 16b. The first network node 101 may comprise a processing circuitry 1605, e.g., one or more processors such as the processor 1605, in the first network node 101 and the memory 1606. The first network node 101 may also comprise a radio circuitry 1611, which may comprise e.g., the receiving port 1607 and the sending port 1608. The processing circuitry 1605 may be configured to, or operable to, perform the method actions according to FIG. 5, and any of FIG. 6-FIG. 15, in a similar manner as that described in relation to FIG. 16a. The radio circuitry 1611 may be configured to set up and maintain at least a wireless connection with the first node 101. Circuitry may be understood herein as a hardware component.

Hence, embodiments herein also relate to the first network node 101 operative to handle directions of transmission of beamformed beams by a first radio network node 111, the first network node 101 being operative to operate in the wireless communications network 100. The first network node 101 may comprise the processing circuitry 1605 and the memory 1606, said memory 1606 containing instructions executable by said processing circuitry 1605, whereby the first network node 101 is further operative to perform the actions described herein in relation to the first network node 101, e.g., in FIG. 5, and any of FIG. 6-FIG. 15.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

The invention claimed is:

1. A method, performed by a first network node, for handling directions of transmission of beamformed beams by a first radio network node, the first network node and the first radio network node operating in a wireless communications network, the method comprising:
   determining, out of a set of directions in which the first radio network node is capable of transmitting the beamformed beams, a subset of directions of transmission of the beamformed beams having a probability of detection above a threshold, by a first wireless device operating in the wireless communications network, the determining being based on data obtained from previous attempts of positioning one or more second wireless devices using at least some of the directions in the set of directions; and
   initiating to provide, to one or more of the first radio network node and a second network node operating in the wireless communications network, an indication of the determined subset.

2. The method according to claim 1, wherein the probability of detection is a probability of performing one or more of a Time of Arrival (TOA) measurement and a Time Difference of Arrival (TDOA) measurement.

3. The method according to claim 1, wherein the method further comprises:
   obtaining a first set of the data, the first set of the data being simulated data indicating an estimated probability of detection, by a simulated wireless device, of the beamformed beams in the set of directions, as estimated by ray-tracing simulations.

4. The method according to claim 1, wherein the subset of directions is a first subset, and wherein the method further comprises:
   obtaining a second set of the data, the second set of the data being historical data indicating an observed probability of detection, by one or more third wireless devices operating in the wireless communications network of the beamformed beams in another subset of the set of directions.

5. The method according to claim 1, wherein the beamformed beams are first beamformed beams, the set of directions is a first set of directions, the subset of directions is a first subset of directions, the obtained data is first obtained data, the probability of detection is a first probability of detection, and the previous attempts are first previous attempts, wherein the determining further comprises:
   determining out of a second set of directions in which a second radio network node operating in the wireless communications network is capable of transmitting second beamformed beams, a second subset of directions of transmission of the second beamformed beams having a second probability of detection above the threshold, by the first wireless device, the determining of the second subset being based on second data obtained from second previous attempts of positioning the one or more second wireless devices using at least some of the directions in the second set of directions; and
   determining out of a third set of directions in which a third radio network node operating in the wireless communications network is capable of transmitting third beamformed beams, a third subset of directions of transmission of the third beamformed beams having a third probability of detection above the threshold, by the first wireless device, the determining of the third subset being based on third data obtained from third previous attempts of positioning the one or more second wireless devices using at least some of the directions in the third set of directions.

6. The method according to claim 5, wherein the method further comprises:
obtaining, from the first wireless device operating in the wireless communications network one or more of a Time of Arrival (TOA) measurement and a Time Difference of Arrival (TDOA) measurement, based on the determined first subset of directions, the determined second subset of directions, and the determined third subset of directions; and
determining a position of the first wireless device based on the obtained one or more of the TOA measurement and the TDOA measurement.

7. The method according to claim 1, wherein any probability of detection is a probability of detection of an individual network node.

8. The method according to claim 1, wherein the beamformed beams are first beamformed beams, the set of directions is a first set of directions, and wherein a second radio network node operating in the wireless communications network is capable of transmitting second beamformed beams in a second set of directions of transmission, and wherein the probability of detection above the threshold by the first wireless device comprises a probability of joint detection, by the first wireless device, in the subset of directions of transmission of the first beamformed beams, of the second beamformed beams in a second subset of directions of transmission of the second set of directions of transmission of the second beamformed beams, and wherein the previous attempts of positioning the one or more second wireless devices have further used at least some of the directions in the second set of directions.

9. The method according to claim 8, wherein the probability of detection above the threshold is comprised in a set of probabilities, each of the probabilities in the set of probabilities being a respective fourth probability of joint detection, by the first wireless device, of a respective one of the first beamformed beams transmitted in a respective first direction and a respective one of the second beamformed beams transmitted in a respective second direction, being above the threshold.

10. The method according to claim 3, wherein the first set of the data are simulated data indicating an estimated probability of joint detection, by the simulated wireless device, of the first beamformed beams in the first set of directions and second beamformed beams in a second set of directions of, as estimated by ray-tracing simulations.

11. The method according to claim 4, wherein the second set of the data are historical data indicating an observed probability of joint detection, by the one or more third wireless devices of the first beamformed beams in another first subset of the first set of directions and second beamformed beams in another second subset of second set directions, being above the threshold.

12. A first network node configured to handle directions of transmission of beamformed beams by a first radio network node, the first network node and the first radio network node being configured to operate in a wireless communications network, the first network node comprising:
a processor; and
a memory containing instructions which, when executed by the processor, cause the first network node to:
determine, out of a set of directions in which the first radio network node is configured to be capable of transmitting the beamformed beams, a subset of directions of transmission of the beamformed beams configured to have a probability of detection above a threshold, by a first wireless device configured to operate in the wireless communications network, wherein to determine is configured to be based on data configured to be obtained from previous attempts of positioning one or more second wireless devices using at least some of the directions in the set of directions; and
initiate to provide, to one or more of the first radio network node and a second network node configured to operate in the wireless communications network, an indication of the subset configured to be determined.

13. The first network node according to claim 12, wherein the probability of detection is configured to be a probability of performing one or more of a Time of Arrival (TOA) measurement and a Time Difference of Arrival (TDOA) measurement.

14. The first network node according to claim 12, wherein the first network node is further to:
obtain a first set of the data, the first set of the data being configured to be simulated data configured to indicate an estimated probability of detection, by a simulated wireless device, of the beamformed beams in the set of directions, as configured to be estimated by ray-tracing simulations.

15. The first network node according to claim 12, wherein the subset of directions is a first subset, and wherein the first network node is further to:
obtain a second set of the data, the second set of the data being configured to be historical data configured to indicate an observed probability of detection, by one or more third wireless devices configured to operate in the wireless communications network of the beamformed beams in another subset of the set of directions.

* * * * *